United States Patent
Morikawa

(10) Patent No.: US 7,913,171 B2
(45) Date of Patent: Mar. 22, 2011

(54) COMMUNICATION CONTROL DEVICE, COMMUNICATION CONTROL METHOD, AND COMMUNICATION CONTROL SYSTEM

(75) Inventor: Hiroshi Morikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 473 days.

(21) Appl. No.: 11/704,432

(22) Filed: Feb. 8, 2007

(65) Prior Publication Data

US 2007/0198845 A1 Aug. 23, 2007

(30) Foreign Application Priority Data

Feb. 20, 2006 (JP) ................................ 2006-043150
Dec. 6, 2006 (JP) ................................ 2006-329888

(51) Int. Cl.
*G06F 3/00* (2006.01)
(52) U.S. Cl. ......... 715/740; 715/744; 709/233; 709/234
(58) Field of Classification Search .......... 715/740–748; 709/223–224
See application file for complete search history.

(56) References Cited

U.S. PATENT DOCUMENTS

| | | | | |
|---|---|---|---|---|
| 7,260,597 B1 * | 8/2007 | Hofrichter et al. | ............ | 709/200 |
| 2001/0029521 A1 * | 10/2001 | Matsuda et al. | ............. | 709/201 |
| 2003/0023677 A1 * | 1/2003 | Morison Zuill et al. | ...... | 709/203 |
| 2003/0058275 A1 * | 3/2003 | Pilu et al. | ...................... | 345/751 |
| 2003/0105849 A1 * | 6/2003 | Iwamoto et al. | .............. | 709/223 |
| 2004/0049524 A1 * | 3/2004 | Toyota et al. | ................. | 707/203 |
| 2004/0064762 A1 * | 4/2004 | Deshpande et al. | ............ | 714/44 |
| 2004/0075619 A1 * | 4/2004 | Hansen | .......................... | 345/1.1 |
| 2004/0139156 A1 * | 7/2004 | Matthews et al. | ............ | 709/204 |
| 2005/0036162 A1 * | 2/2005 | Edge et al. | ..................... | 358/1.9 |
| 2006/0077422 A1 * | 4/2006 | Mathieson et al. | .......... | 358/1.15 |
| 2006/0095433 A1 * | 5/2006 | Kano | ................................ | 707/10 |
| 2006/0120616 A1 * | 6/2006 | Kita | .............................. | 382/254 |
| 2006/0208871 A1 * | 9/2006 | Hansen | ........................ | 340/506 |
| 2007/0086041 A1 * | 4/2007 | Richtsmeier | ................. | 358/1.15 |
| 2007/0130289 A1 * | 6/2007 | Defazio et al. | ................ | 709/218 |
| 2007/0143398 A1 * | 6/2007 | Graham | ........................ | 709/204 |
| 2008/0091800 A1 * | 4/2008 | Sorrentino et al. | ........... | 709/219 |

FOREIGN PATENT DOCUMENTS

| | | |
|---|---|---|
| JP | 2003-44375 | 2/2003 |
| JP | 2003-162399 | 6/2003 |

OTHER PUBLICATIONS

"Canon: iR C5870 | Remote operation", http://cweb.canon.jp/color-ir/lineup/irc5870/management/operation.html.

* cited by examiner

*Primary Examiner* — Tadeese Hailu
(74) *Attorney, Agent, or Firm* — Cooper & Dunham LLP

(57) ABSTRACT

A receiving unit receives user-specific identification data from a display processing device connected via a network. A transmitting unit transmits operation screen data to the display processing device, which is for displaying an operation screen for receiving an operation from a user specified by the user-specific identification data received by the receiving unit.

20 Claims, 18 Drawing Sheets

FIG.13
(A)
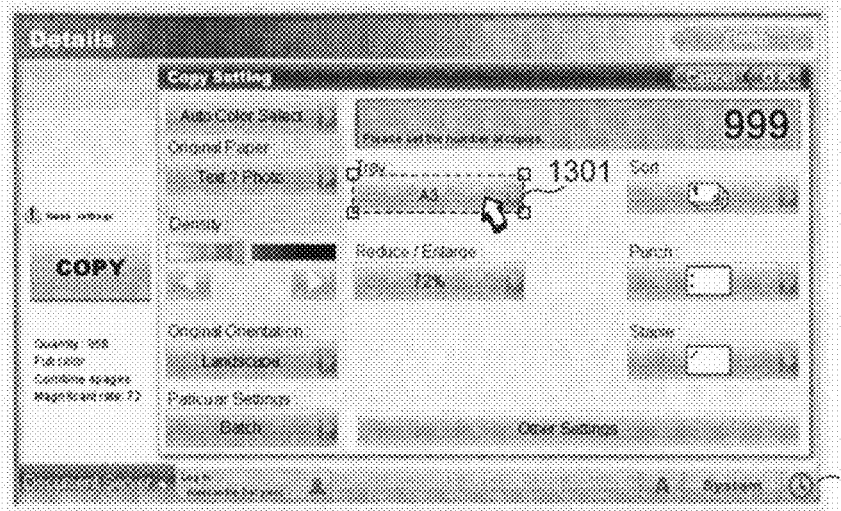
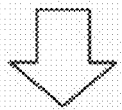 MAGNIFICATION
(B)
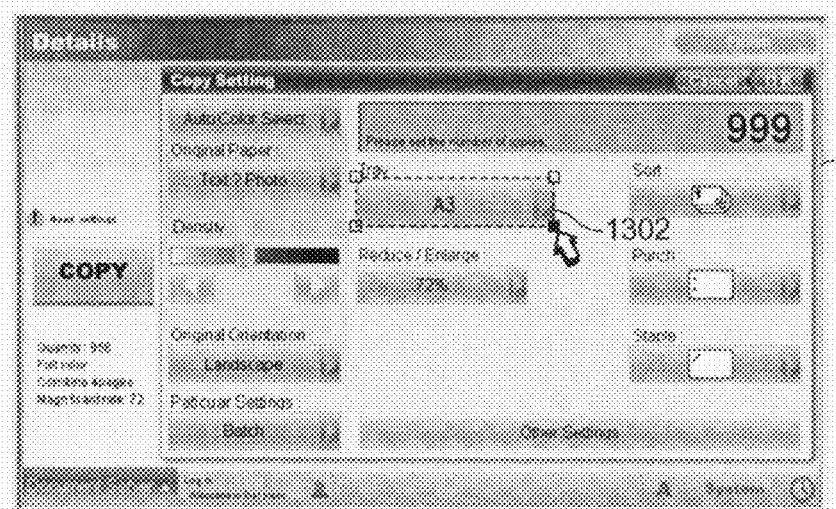

COMMUNICATION CONTROL DEVICE, COMMUNICATION CONTROL METHOD, AND COMMUNICATION CONTROL SYSTEM

CROSS-REFERENCE TO RELATED APPLICATIONS

The present document incorporates by reference the entire contents of Japanese priority document, 2006-043150 filed in Japan on Feb. 20, 2006, and Japanese priority document, 2006-329888, filed on Dec. 6, 2006.

BACKGROUND OF THE INVENTION

1. Technical Field

This disclosure relates to a communication control device, a communication control method, and a communication control system that displays user operation screen at a remote location.

2. Description of the Related Art

Recent years have seen a rise in electronic products that receive information from external sources by connecting to network. Particularly, network is rapidly becoming an integral part of a typical office, and working by connecting electronic devices present in the office to network is often sought.

An image forming apparatus that functions as a printer, a copier, a facsimile machine, and a scanner (hereinafter, "a multifunction product (MFP)") is an example of such an electronic device used in an office. The MFP equipped with a storage device has been developed recently so that image data input into the image forming apparatus can be stored and read later.

The MFP equipped with a network connection interface to facilitate connecting to network has also been developed in view of the demand for operations over network. Thus, devices like the MFP come equipped with communication control functions. In this context, it has also become possible to monitor various devices via network.

For example, in the technology disclosed in Japanese Patent Application Laid-open No. 2003-162399 (hereinafter, "first document"), status information of an image forming apparatus can be collected by a monitoring device and sent to a server at a remote monitoring center over network.

A technology by which the MFP can be remote-operated from a personal computer (PC) connected to the MFP via network has been proposed in a publication titled "Canon: iR C5870 Remote Operation", [online], [found on Feb. 11, 2006], <URL: http://cweb.canon.jp/color-ir/lineup/irc5870/management/operation.html> (hereinafter, "second document"). This technology enables an administrator to check the status of the MFP from the PC, and intervene on behalf of the user if the user faces some problem concerning the operation of the MFP.

However, while the technology disclosed in the first document is useful for identifying errors, the disadvantage is that the administrator at a remote location is unable to appropriately address queries raised by the user as the screen at the user-end is not available at the administrator-end.

In the technology disclosed in the second document, the administrator can view the liquid crystal touch panel being looked up by the user. However, there is a likelihood of a plurality of users logged into the MFP at any given time. Though it is possible for individual users to operate the MFP from their individual PC, the administrator can only look up the liquid crystal touch panel. In other words, the administrator is unable to view the screen being looked up by every user that has logged into the MFP, as there is no user selection menu available.

BRIEF SUMMARY

A communication control device according to an aspect of this disclosure includes a receiving unit that receives user-specific identification data from a display processing device connected via a network; and a transmitting unit that transmits operation screen data to the display processing device, the operation screen data for displaying an operation screen for receiving an operation from a user specified by the user-specific identification data received by the receiving unit.

A communication control method according to another aspect of this disclosure includes receiving user-specific identification data from a display processing device connected via a network; and transmitting operation screen data to the display processing device, the operation screen data for displaying an operation screen for receiving an operation from a user specified by the user-specific identification data received at the receiving.

A communication control system according to still another aspect of this disclosure includes a display processing device and a communication control device connected via a network. The communication control device includes a first receiving unit that receives user-specific identification data from a display processing device connected via a network, and a first transmitting unit that transmits operation screen data to the display processing device, the operation screen data for displaying an operation screen for receiving an operation from a user specified by the user-specific identification data received by the first receiving unit. The display processing device includes a second transmitting unit that transmits the user-specific identification data of a user logged into the communication control unit to the communication control unit, a second receiving unit that receives the operation screen data from the first transmitting unit, and a display processing unit that displays the operation screen based on the operation screen data received by the second receiving unit.

The above and other aspects, features, advantages and technical and industrial significance will be better understood by reading the following detailed description of presently preferred embodiments of the invention, when considered in connection with the accompanying drawings.

BRIEF DESCRIPTION OF THE DRAWINGS

FIG. 13 is a screenshot for explaining how to change the size of Tray button on the UI customization screen displayed by the display processor of the PC according to the embodiment;

DETAILED DESCRIPTION OF THE PREFERRED EMBODIMENTS

Exemplary embodiments of the present invention are explained in detail below with reference to the accompanying drawings. According to an embodiment of the present invention, an image processing apparatus equipped with a communication control device is a type of image forming apparatus, such as an MFP that functions as a copier, a facsimile (FAX) machine, a printer, a scanner, and a distributor of input image (scanned image or images input by printer or FAX).

According to the embodiment, the image processing device is applied to an MFP. It is possible to apply the image processing device to other electronic devices such as copiers or facsimile machines used in a business environment. By applying the image processing device to business office devices, the operation of the concerned devices can be coordinated. Apart from the image processing device, a communication control device that sends and receives data over the network can also be applied to the present invention. In other words, the screen data that is displayed on the communication control device is displayed on all the display processing devices connected via network. Consequently, uniform operation can be ensured irrespective of the device.

The image processing device according to the embodiment is applied to a personal computer (PC) connected to the MFP via network. The image processing device in the present invention is not limited to the PC alone and can include business office devices, mobile handsets, car navigation devices, etc., as well as other external devices mentioned later. The method used for remote operation of the MFP will vary according the external device. An operation method appropriate to the external device may be adopted.

Figure 1:
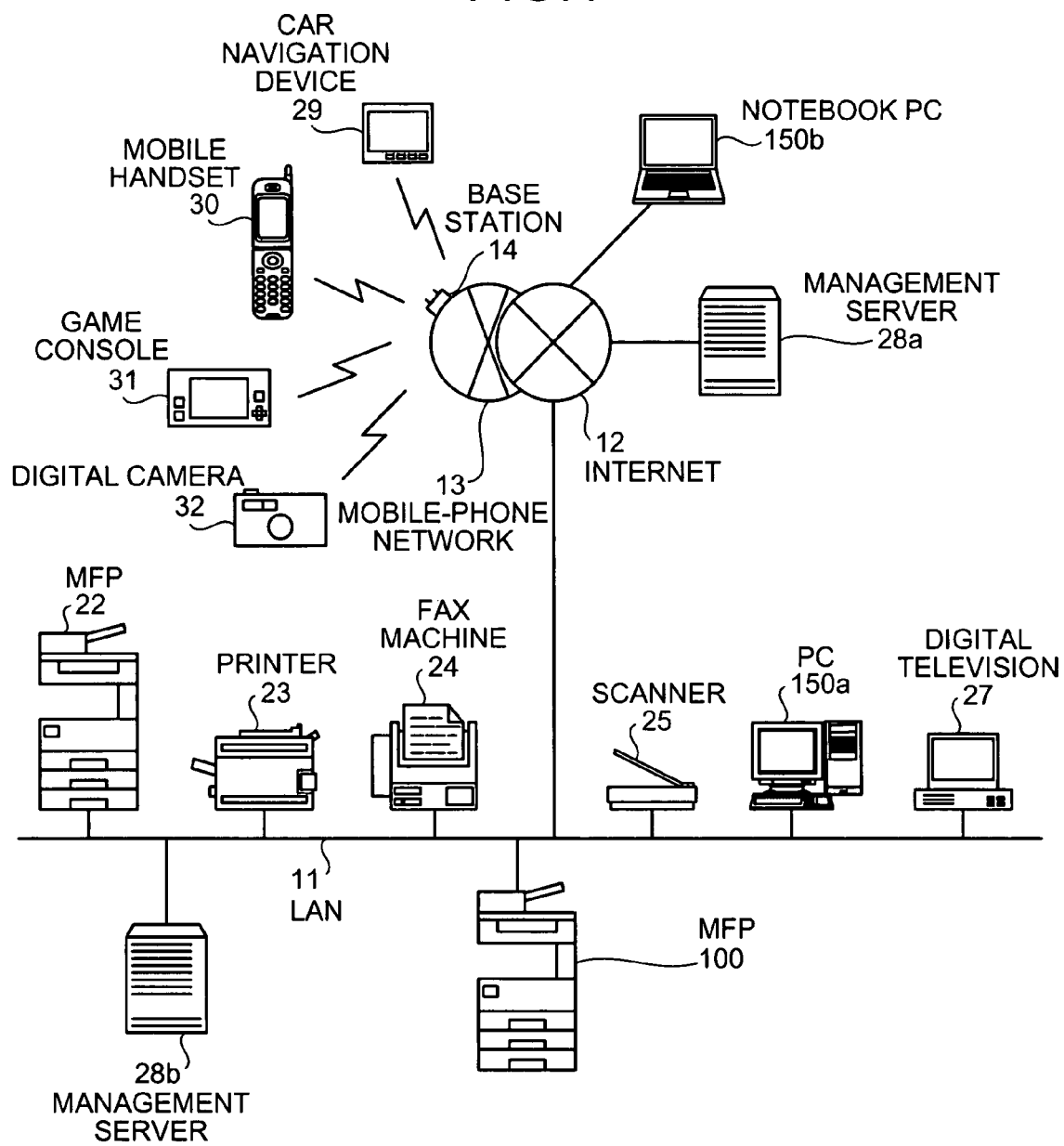
FIG. 1 is a schematic of an MFP according to an embodiment of the present invention.

FIG. 1 is a schematic of an MFP 100 and various external devices connected to the MFP 100 via a communication network. The MFP 100 is connected, via a local area network (LAN) 11, to a plurality of external devices (namely, a second MFP 22, a printer 23, a FAX machine 24, a scanner 25, a personal computer (PC) 150a, a digital television 27, a management server 28b, etc.). The MFP 100 is connected to external devices such as a second management server 28a, and a notebook PC 150b, etc. over the Internet 12. A Web server 28 is communicably connected, via the Internet 12, a mobile-phone network 13, and a nearest base station 14, to external devices such as a car navigation device (including "a car") 29, a mobile handset (including "a PHS phone" and "a PDA") 30, a game console 31, a digital camera 32, etc.

The external device should preferably be connectable to network, and can be the car navigation device 29, the game console 31, the digital camera 32, etc., apart from the mobile handset 30. Though not shown in FIG. 1, external device can include wristwatches, automatic vending machines, water meter, gas meter, etc. These external devices can exchange data via the Internet 21 or the mobile-phone network 13. Each external device can communicate by connecting to a mobile phone, etc. or by a communication unit that may be fitted into the device.

The management servers 28a and 28b manage the data exchanged between the external devices and the MFP 100, and may function as a Web server as well. The management servers 28a and 28b can be connected, like the management server 28b, to the LAN 11 as the MFP 22, or like the management server 28a, to a public network like the Internet 21. One or several management servers can be connected to network depending on the requirement. Alternatively, management server can be altogether done away with, if not required.

Though not shown in FIG. 1, a server device such as Simple Mail Transfer Protocol (SMTP) server, File Transfer Protocol (FTP) server, or distribution server, can be connected to the network. Distribution server can be used for exchange of electronic mail or file transfers and for communicating with a FAX machine at another location over the public network. The MFP 100 sends and receives data via the server devices.

As shown in FIG. 1, when connected to the network, the MFP 100 and the external devices such as the PC 150a and the notebook PC 150b can mutually communicate. Further, by providing the MFP 100 with a storage device such as a hard disk, the MFP can be upgraded to a network MFP that can meet diverse requirements of the users.

Apart from functioning as a copier, the MFP 100 also functions as a printer printing document data, etc. upon a print request from the external device like the PC 150a, the notebook PC 150b, etc., a FAX machine sending, upon request from a client device, document data to another FAX machine located elsewhere via a modem connected to a server PC, and a storage device storing received fax document or copy documents in an in-built hard disk. The term client device refers to a device that can send data to and receive data from the MFP 100, and according to the embodiment the PC 150a and the notebook PC 150*b* represent the client device. However, any external device that can be connected to the network can be a client device.

Figure 2:
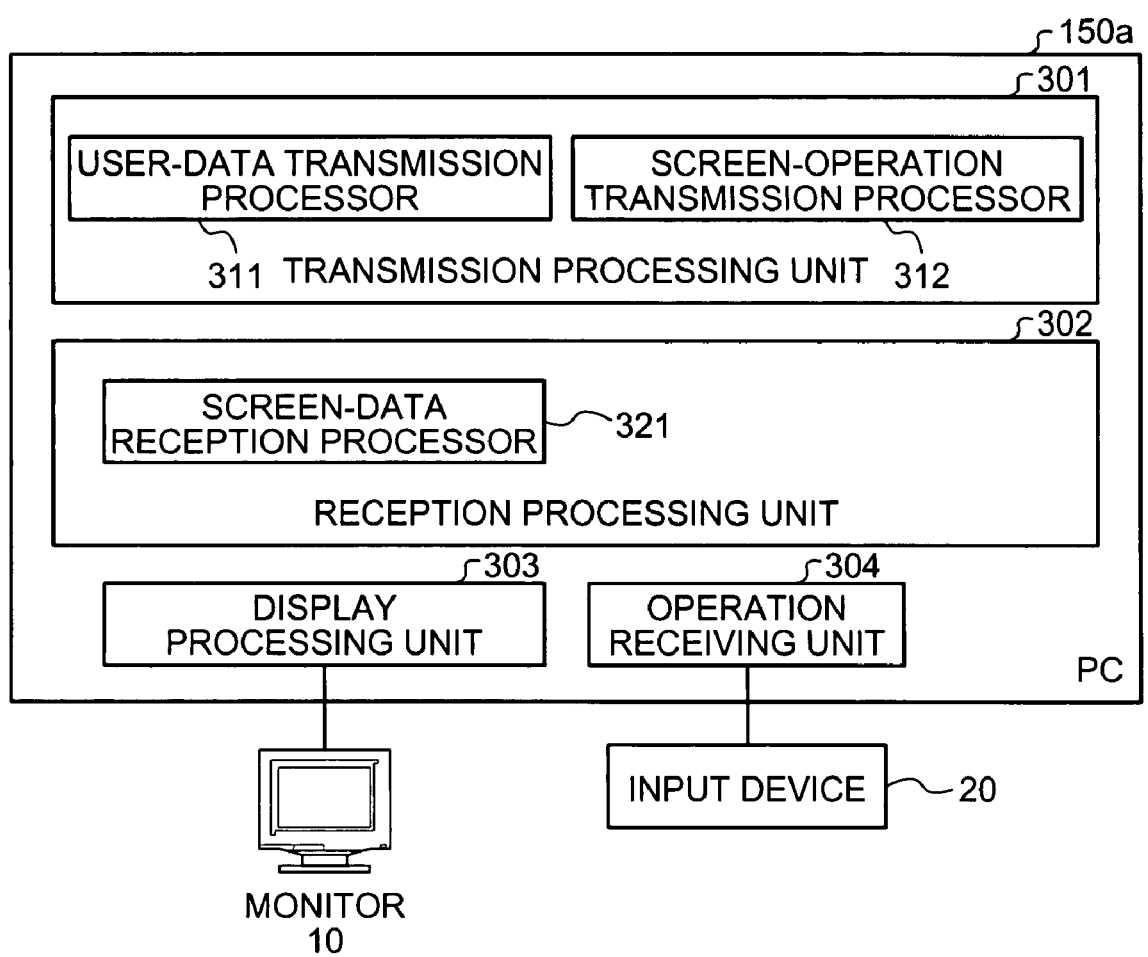
FIG. 2 is a functional block diagram of a personal computer (PC) according to an embodiment of the present invention.

FIG. 2 is a functional block diagram of the PC 150*a* according to the embodiment. The PC 150*a* includes a transmission processing unit 301, a reception processing unit 302, a display processing unit 303, and an operation receiving unit 304. A monitor 10 and an input device 20 are connected to the PC 150*a*.

The operation receiving unit 304 receives the operation input by the user using the input device 20 such as a keyboard or a pointing device.

The display processing unit 303 displays data on the monitor 10. The display processing unit 303 also displays operation screen data received by the reception processing unit 302 on a Web browser, enabling the user to log into the MFP 100 from the PC 150*a*.

The term operation screen data refers to the screen data displayed for receiving operations to be performed on the MFP 100. The display processing unit 303 displays the operation screen displayed by the operation screen data on the monitor 10. The user can then operate the operation screen and use the MFP 100 via the network. The configuration of the PC 150*a* shown in FIG. 2 is mandatory for any client device.

Figure 3:
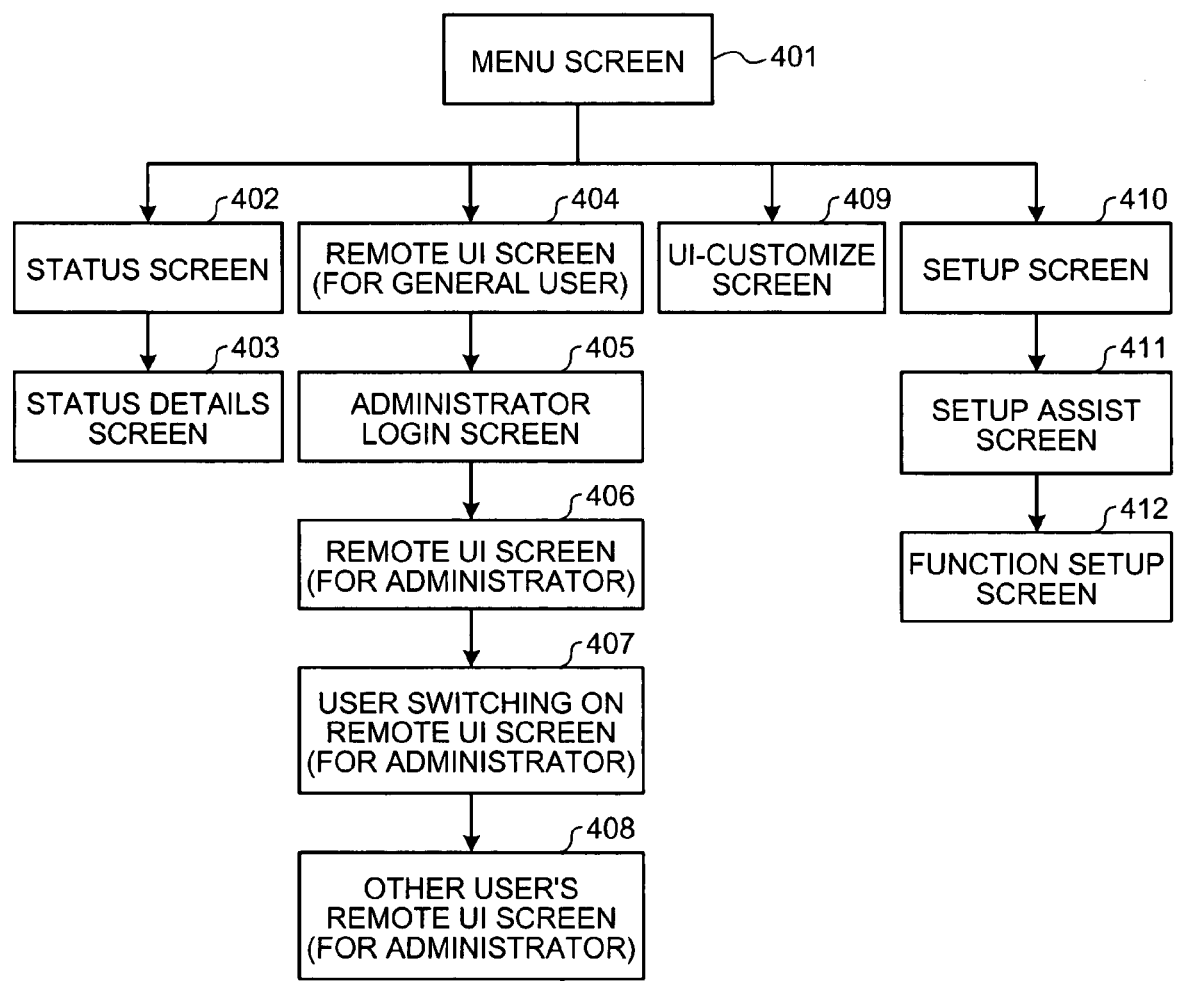
FIG. 3 is a drawing of screen transitions displayed by a display processor of the PC according to the embodiment.

FIG. 3 is a drawing of screen transitions displayed by the display processing unit 303. When an attempt is made to access the MFP 100 from the Web browser of the PC 150*a*, the operation screen data is exchanged between the PC 150*a* and the MFP 100, and the display processing unit 303 displays a menu screen 401.

When the user selects the buttons on the menu screen 401, the display processing unit 303 changes the display on the screen according to the screen transitions shown in FIG. 3. The screen transitions take place by a sequence of actions involving the PC 150*a* requesting the MFP 100 for the next operation screen data, the MFP 100 sending the relevant operation screen data to the PC 150*a*, and the PC 150*a* receiving the operation screen data. In other words, the operation screen data is created in the MFP 100.

Apart from the menu screen 401, the display processing unit 303 can display a status screen 402, a status details screen 403, a user's remote user interface (UI) screen 404 for general users, an administrator's login screen 405, an administrator's remote UI screen 406, an other user's remote UI screen 408, a UI-customize screen 409, a setup screen 410, a setup assist screen 411, and a function setup screen 412.

Figure 4:
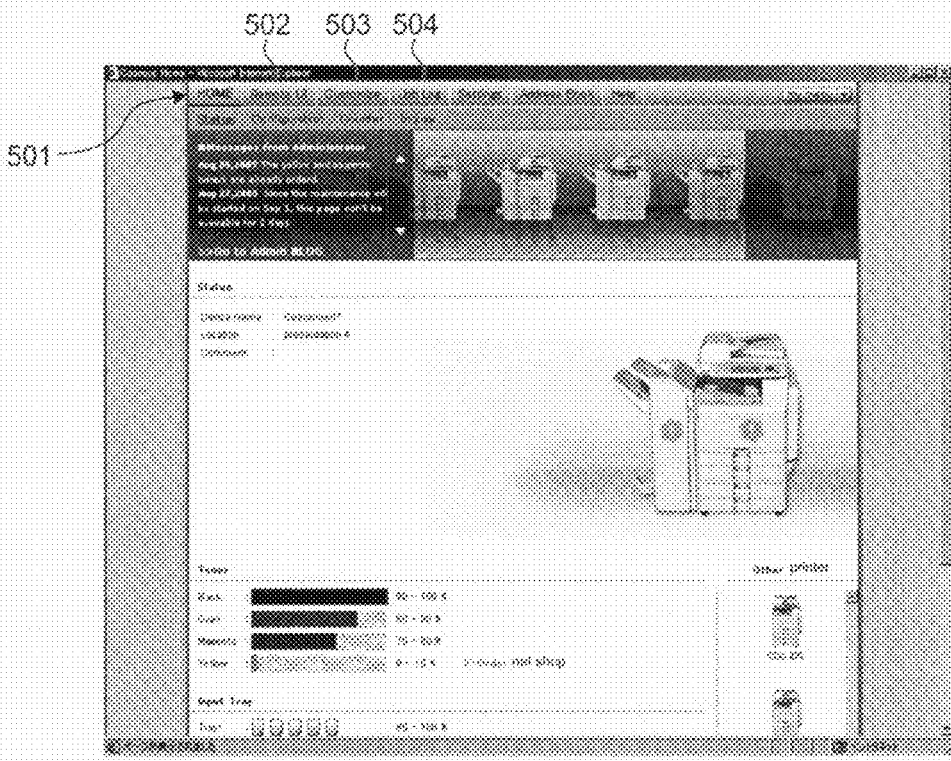
FIG. 4 is a screenshot of a menu screen displayed by the display processor of the PC according to the embodiment.

FIG. 4 is a screenshot of the menu screen displayed by the display processing unit 303. Apart from enabling the current status of the MFP 100 to be looked up, the menu screen includes a button group 501 using which other screens can be opened.

For example, when the operation receiving unit 304 receives the selection of a Remote UI button 502, the display processing unit 303 displays the user's remote UI screen 404 described later. Likewise, when the operation receiving unit 304 receives the selection of a Customize button 503, the display processing unit 303 displays the UI-customize screen 409 described later. Similarly, when the operation receiving unit 304 receives the selection of a Setup button 504, the display processing unit 303 displays the setup screen 410 described later.

Figure 5:
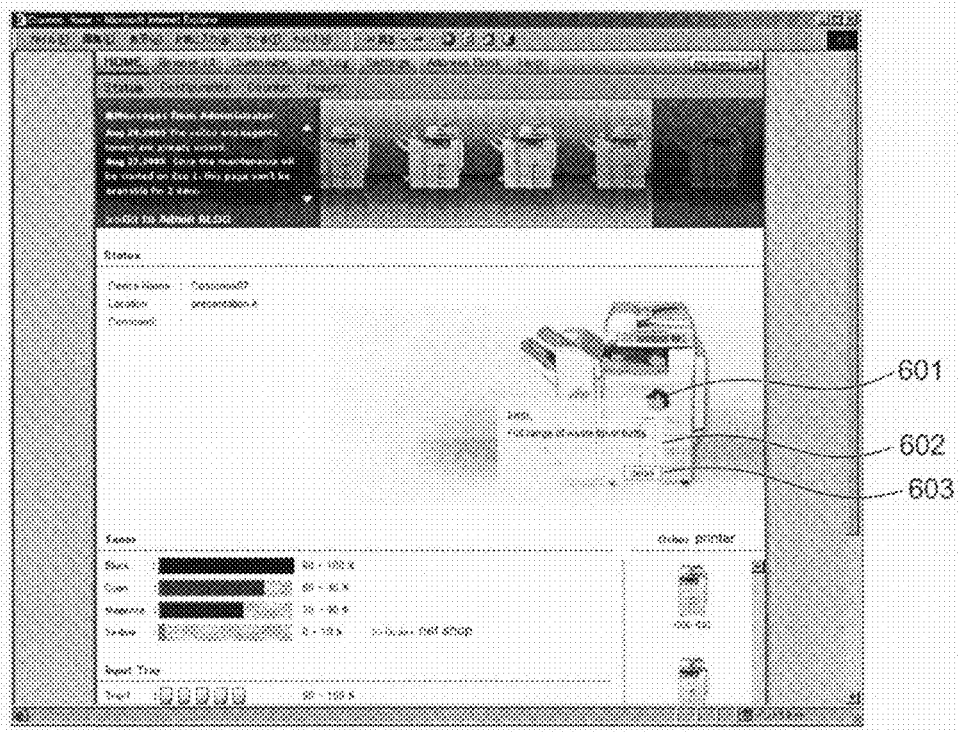
FIG. 5 is a screenshot of a status screen displayed by the display processor of the PC according to the embodiment.

FIG. 5 is a screenshot of the status screen displayed by the display processing unit 303. As shown in FIG. 5, it is assumed that the status screen is a part of the menu screen. The display processing unit 303 displays a general view of the MFP 100 and an exclamation mark (!) 601 at the location of error. When the operation receiving unit 304 receives the selection of the exclamation mark 601, the display processing unit 303 displays a popup window 602 displaying the error description. When the operation receiving unit 304 further receives the selection of a Details button 603, the display processing unit 303 displays the status details screen 403.

Figure 6:
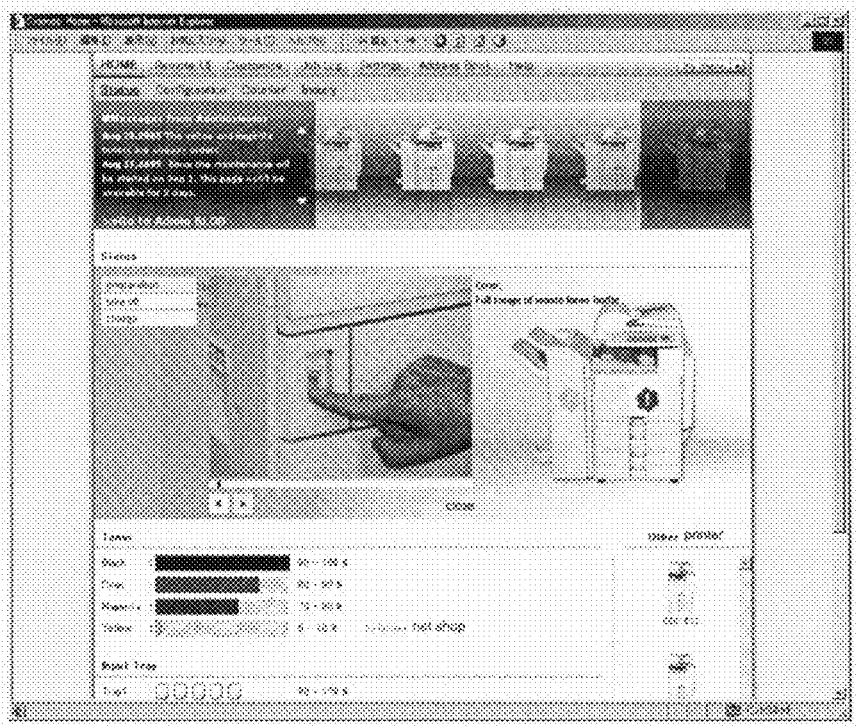
FIG. 6 is a screenshot of a status details screen displayed by the display processor of the PC according to the embodiment.

FIG. 6 is a screenshot of the status details screen 403 displayed by the display processing unit 303. The status details screen 403 displays an animated image depicting how to resolve the problem. The user can refer to this screen to restore the normal functioning of the device. Even though an animated image is used for depicting how to resolve errors according to the embodiment, any method of display can be used as long as the user can be made aware of how to resolve the problem.

Figure 7:
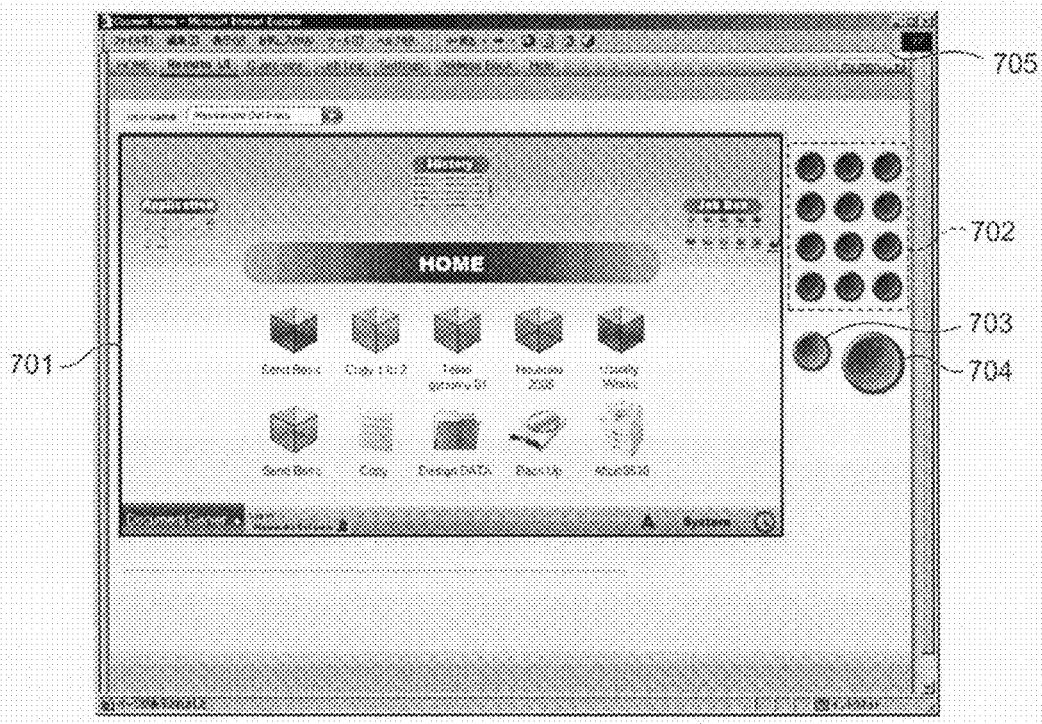
FIG. 7 is a screenshot of a user's remote user interface (UI) screen displayed by the display processor of the PC according to the embodiment.

FIG. 7 is a screenshot of the user's remote UI screen 404 displayed by the display processing unit 303. The contents of the user's remote UI screen 404 are identical to an operation panel 204 of the MFP 100. Specifically, a screen that is output to a liquid-crystal-display (LCD) touch panel 1820 of the MFP 100 is displayed in a display area 701 of the user's remote UI screen 404. Thus, the user can operate the MFP 100 without any confusion. Further, the user with an administrator's privilege can open the administrator's login screen 405 from the user's remote UI screen 404. On the screen shown in FIG. 7, the administrator's login screen 405 can be selected from a My menu button 705.

Figure 8:
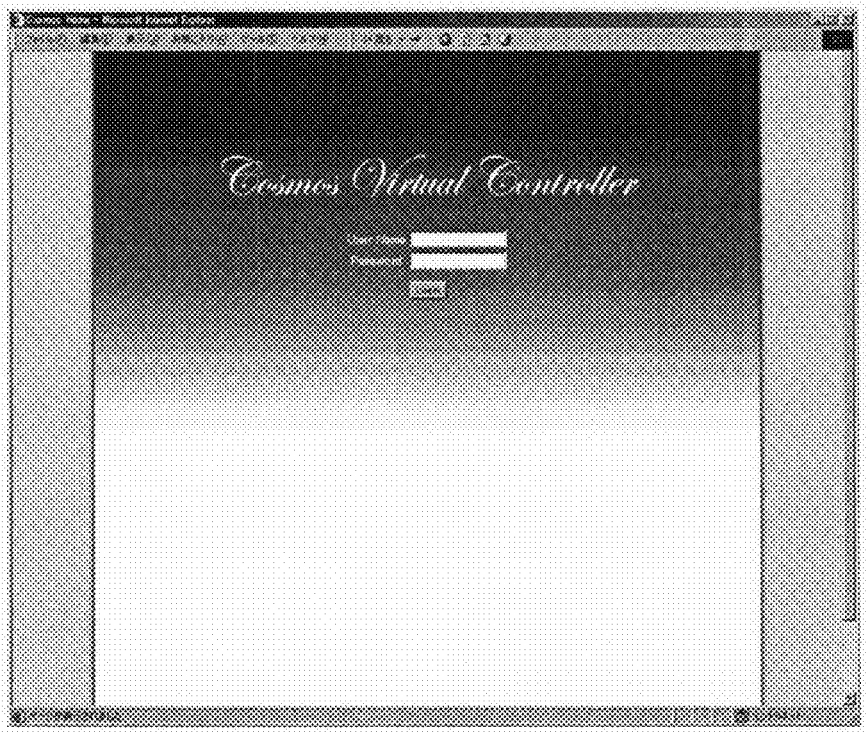
FIG. 8 is a screenshot of an administrator's login screen displayed by the display processor of the PC according to the embodiment.

FIG. 8 is a screenshot of the administrator's login screen 405 displayed by the display processing unit 303. Upon receiving input of user name and password, the operation receiving unit 304 sends the user name and password to the MFP 100. Upon authentication of the user name and password by the MFP 100, the PC 150*a* retrieves the operation screen data of the administrator's remote UI screen 406, enabling the administrator's remote UI screen 406 to be displayed.

Figure 9:
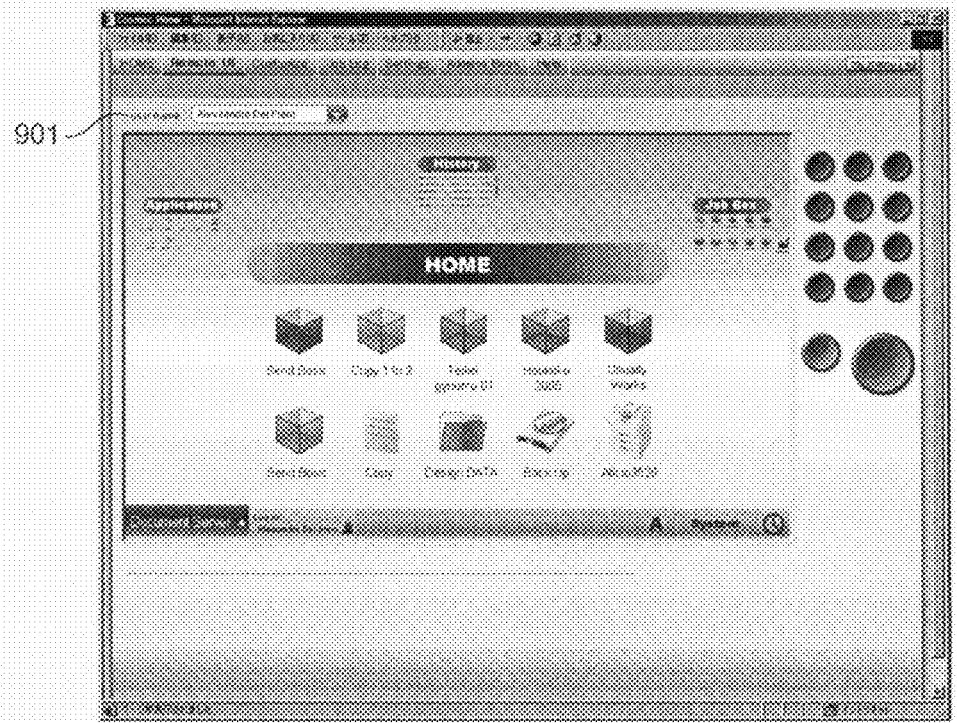
FIG. 9 is a screenshot of an administrator's remote UI screen displayed by the display processor of the PC according to the embodiment.

FIG. 9 is a screenshot of the administrator's remote UI screen 406 displayed by the display processor. The contents of the administrator's remote UI screen 406 are identical to the operation panel that is displayed when the administrator logs into the MFP 100, identical to the user's remote UI screen 404 described above, except that on the administrator's remote UI screen 406 the display processing unit 303 displays a pulldown menu 901 of user names.

Figure 10:
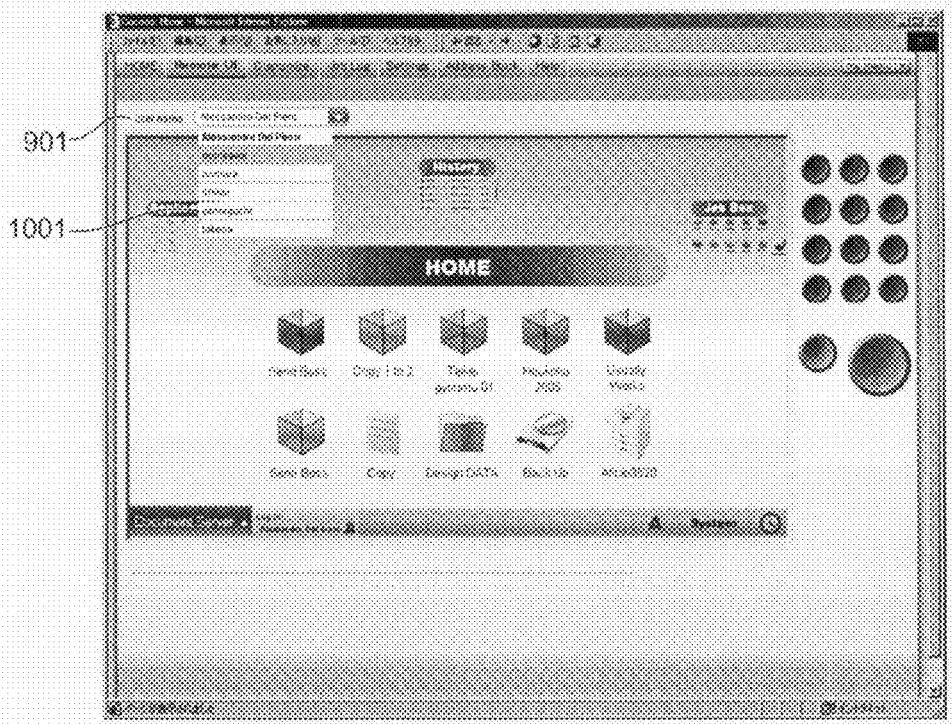
FIG. 10 is a screenshot of the administrator's remote UI screen displayed by the display processor of the PC according to the embodiment on which a different user is selected.

FIG. 10 is a screenshot of the administrator's remote UI screen 406 displayed by the display processing unit 303 on which a different user is selected. Upon clicking the pulldown menu 901 on the administrator's remote UI screen 406, the display processing unit 303 displays a user selection list 1001 consisting of all the users currently logged in. When the operation receiving unit 304 receives selection of a user from the administrator, the display processing unit 303 displays the user's remote UI screen 404 of the selected user. The operation screen data of the selected user can be retrieved from the MFP 100 by sending the user ID, etc. of the user from the PC 150*a*. The operation receiving unit 304 thus can also be called a selection receiving unit. The process procedure is described in detail later.

Figure 11:
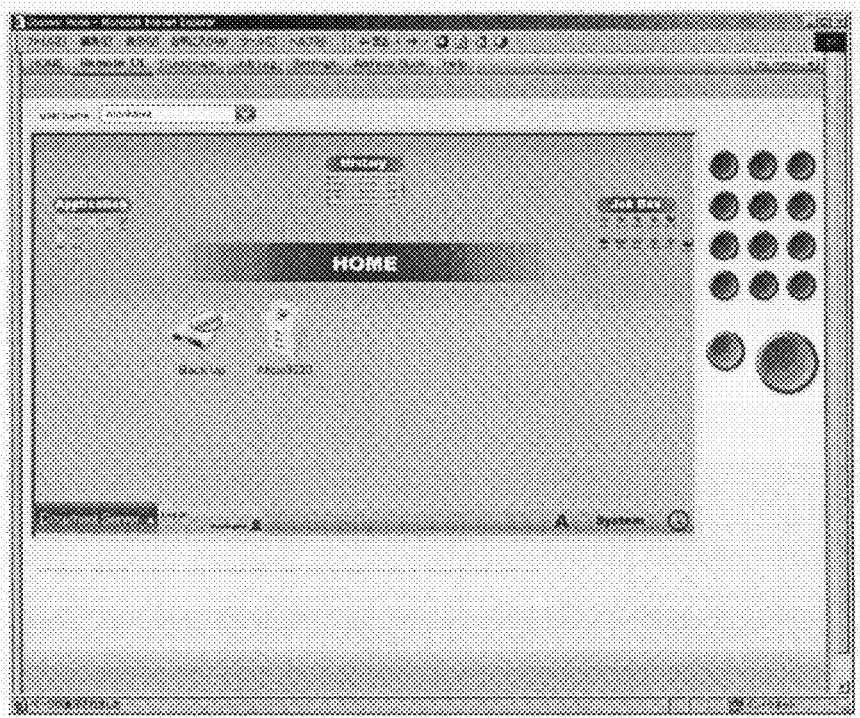
FIG. 11 is a screenshot of an administrator's user remote UI screen displayed by the display processor of the PC according to the embodiment.

FIG. 11 is a screenshot of the other user's remote UI screen 408 displayed by the display processing unit 303. As shown in FIG. 11, the display processing unit 303 opens from the administrator's remote UI screen 406 the other user's remote UI screen 408 of any user who has logged in. In other words, the administrator can see the same screen the user is currently viewing, and if the user is unsure as to how to operate the MFP 100, can easily operate the MFP 100 on behalf of the user. Apart from the user's remote UI screen 404, the other user's remote UI screen 408 can also include the operation panel 204 that is displayed on the user's remote UI screen 404.

The embodiment allows the individual user screen to be customized. In the conventional technology, the screens of all the users are uniform, and once the administrator learns the contents of the screen, not only does he/she not need to look up the operation screen, but he/she can provide solution to a problem conveyed by the user over the phone. If the user screen customization is enabled, the administrator will not be able to know the operation screen being used by the user at any given time. Therefore, according to the embodiment, it has been made possible for the administrator to see the user's remote UI screen 404 being used by the user at any given time, equipping him/her to be able to help out the user in case of any confusion. Customization process of the user screen is described later.

Figure 12:
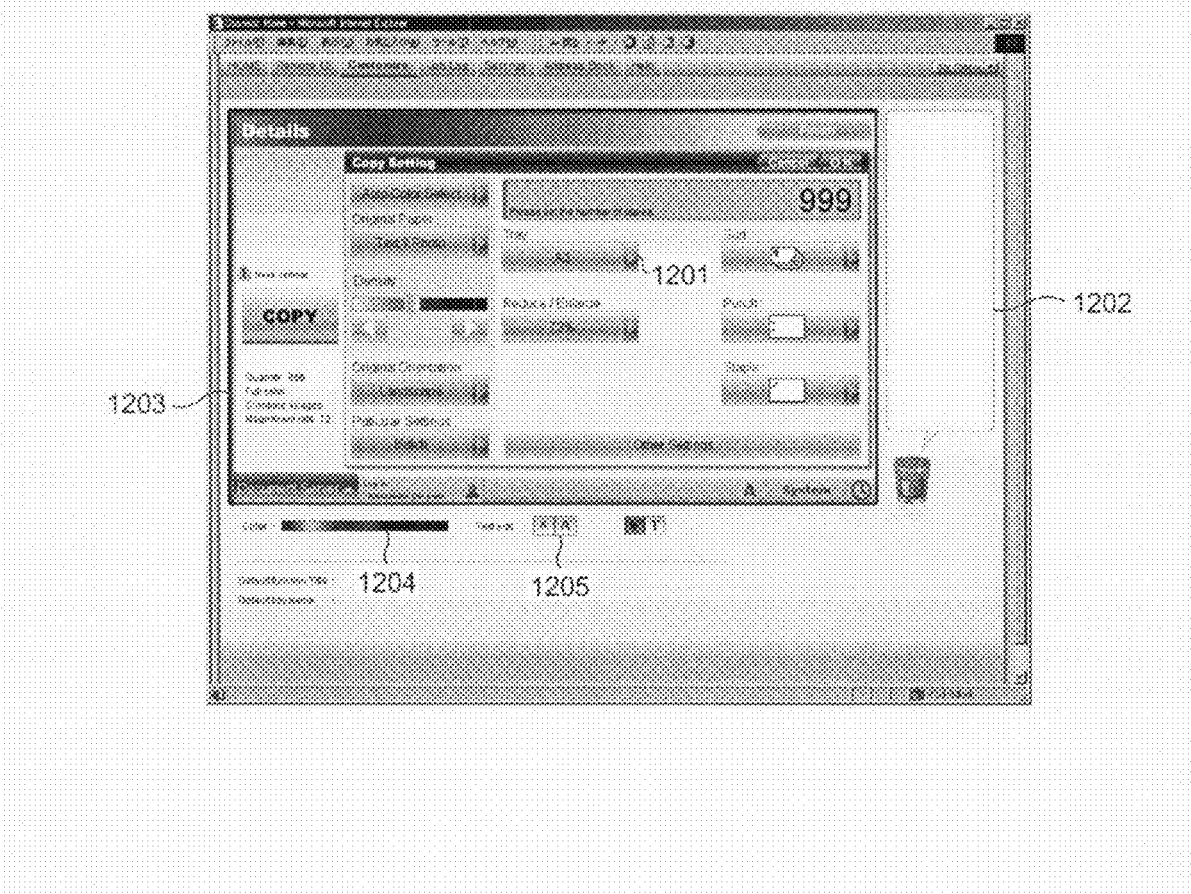
FIG. 12 is a screenshot of a UI customization screen displayed by the display processor of the PC according to the embodiment.

FIG. 12 is a screenshot of the UI-customize screen 409 displayed by the display processing unit 303. As shown in FIG. 12, the display processing unit 303 enables display of the UI-customize screen 409. In other words, a user can change the appearance of the login screen on the liquid crystal touch panel or the PC by customizing the fields and buttons displayed on the UI-customize screen 409. Layout data of the fields and buttons set by the user is sent to the MFP 100, which stores it in a storage unit 207. Thus, when a particular user logs in, the MFP 100 reads the layout data corresponding to the user from the storage unit 207, and outputs the customized operation screen.

A display area 1203 is displayed both on the liquid crystal touch panel and the user's remote UI screen 404. The operation receiving unit 304 is configured to receive operations related to the fields or buttons in the display area 1203. The operations include addition, deletion, rearrangement of buttons, downsizing, enlarging, etc. For example, the field or the button can be dragged and dropped into a deletion area 1202 to delete a field or a button. The operation receiving unit 304 is configured to receive operations pertaining to a color bar 1204 and the display processing unit 303 changes the color of a selected field, button, etc. Similarly, the text size can be varied by changing the value in a Text size field 1205. The method of changing the size of a Tray button 1201 is described below.

FIG. 13 is a screenshot for explaining how to change the size of Tray button. (A) in FIG. 13 is a screenshot showing a Tray button 1301 in a display area 1203a is selected, that is, the operation receiving unit 304 has received the selection of the Tray button 1301 by a pointing device. Next, the operation receiving unit 304 receives the dragging operation of the selected Tray button 1301. The display processing unit 303 then displays an enlarged Tray button 1302 in a display area 1203b shown (B) in FIG. 13. The layout data of the altered fields or button is sent to the MFP 100. Any known method can be similarly used for other operations related to the fields and buttons.

In other words, addressing a demand for security issues and for reducing the number of queries made by the users to the administrator, the manufacturers of MFPs have endeavored to make available to the user only a simple screen, hiding those buttons related to functions of the MFP not meant for the users. However, the time and cost involved in providing the solution is considerable.

However, in the MFP 100 according to the embodiment, the user can use the input device 20 such as a pointing device on the Web page displayed on the client device such as the PC 150a to customize the screen. In other words, the MFP 100 is rendered more user-friendly by providing the function of known image-editing software by which the display contents can be changed. Consequently, the cost and time involved in customization at the manufacturer's end can be reduced.

The administrator can also perform a batch operation for editing the display contents of all the users. Any known method can be adopted by the administrator for batch screen editing. Security can be protected by batch screen editing.

The user is at liberty to change the display contents made available to him/her by the administrator. For example, the screen display can be initially set for a novice, with a large text size and suitable color schemes for easy operability for a beginner. The MFP 100 has enhanced user-friendliness as the screen can be customized for every user.

Any known Web browser customization method can be used. For example, a customization program can be launched by using a plugin function on the Web browser.

Figure 14:
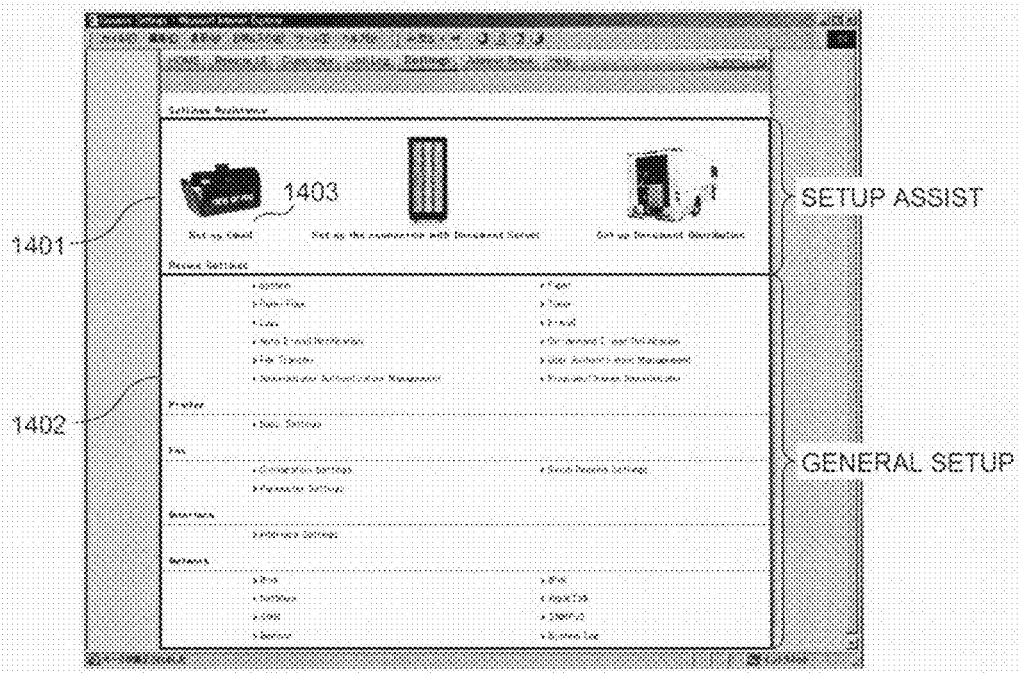
FIG. 14 is a screenshot of a setup screen displayed by the display processor of the PC according to the embodiment.

FIG. 14 is a screenshot of the setup screen displayed by the display processing unit 303. As shown in FIG. 14, the setup screen 410 is roughly divided into two areas, namely, a setup-assist display area 1401 and a general-setup display area 1402. The general-setup display area 1402 includes setup parameters similar to those generally seen in the MFP 100 and hence is not described here. The setup-assist display area 1401 displays processes of the MFP 100 that the user can avail of. When the operation receiving unit 304 receives a selection of a process from the user, the display processing unit 303 displays the setup assist screen 411 described later.

Figure 15:
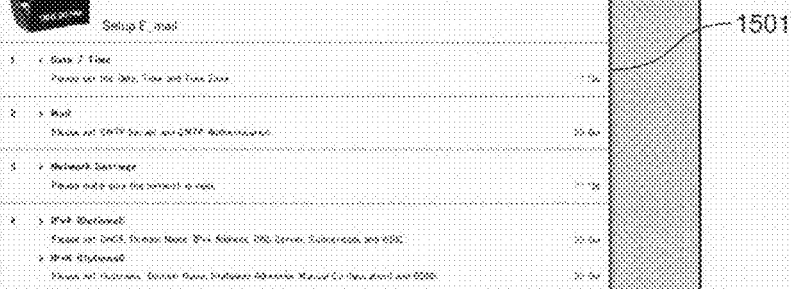
FIG. 15 is a screenshot of a setup assist screen displayed by the display processor of the PC according to the embodiment.

FIG. 15 is a screenshot of the setup assist screen 411 displayed by the display processing unit 303. The setup assist screen 411 shown in FIG. 15 is displayed when the user selects a Setup Email button 1403 shown in FIG. 14. The setup assist screen 411 displays a list of function parameters required to be set for sending and receiving e-mail. Setting these function parameters enables the user to use the MFP 100 for sending and receiving e-mail.

In a conventional MFP, the administrator ended up setting up the setup parameters of all the available functions, irrespective of whether the user will avail of the function or not, as the administrator cannot determine which user would need to use which function. That is, the administrator's onus concerning the setup task is considerable in a conventional MFP.

However, in the MFP 100 according to the present invention, the user can view the setup assist screen 411, which displays the parameters for every function, and select the functions he/she would like to avail of, reducing the administrator's onus concerning the setup task.

Figure 16:
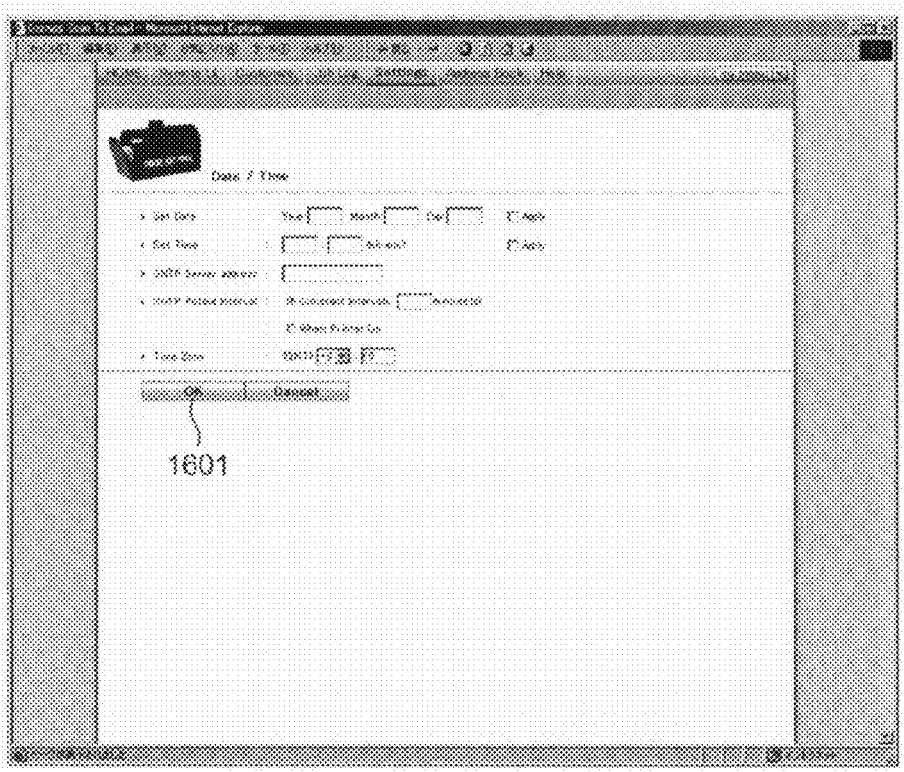
FIG. 16 is a screenshot of a function setup screen displayed by the display processor of the PC according to the embodiment.

FIG. 16 is a screenshot of the function setup screen 412 displayed by the display processing unit 303. The function setup screen 412 shown in FIG. 16 is displayed when the user selects Date/Time parameter shown in FIG. 15. The function setup screen 412 shows date and time fields. The date and time settings are displayed by the display processing unit 303 and are required for sending and receiving e-mail. When the operation receiving unit 304 receives the input of values in all the fields on the function setup screen 412 and the selection of OK button from the user, the display processing unit 303 once again displays the setup assist screen 411 shown in FIG. 15.

By setting values in all the parameters listed on the setup assist screen 411, the user can use the MFP 100 to send and receive e-mail.

Thus, the settings can be changed selectively for only those functions of the MFP 100 required by the user, reducing the administrator's onus concerning the setup task.

Returning to FIG. 2, the transmission processing unit 301 transmits data to an electronic device such as the MFP 100 over network, and includes a user-data transmission processor 311 and a screen-operation transmission processor 312.

The user-data transmission processor 311 transmits user ID and, wherever necessary, password to the MFP 100. For example, the user-data transmission processor 311 transmits the user ID and password required for logging in to display the user's remote UI screen 404. The user-data transmission processor 311 also sends the user ID and password entered on the administrator's login screen 405, and the user ID required for displaying the other user's remote UI screen 408 of a different user from the administrator's remote UI screen 406.

At the same time as the user-data transmission processor 311 transmits the user ID, the screen-operation transmission processor 312 transmits operation data. Thus, the MFP 100 can identify whether the screen to be transmitted should be the user's remote UI screen 404 or the administrator's remote UI screen 406 or the other user's remote UI screen 408.

The screen-operation transmission processor 312 transmits to the MFP 100 the operation data entered in a screen by the user using the input device 20. This enables the PC 150a to receive from the MFP 100 the operation screen data displaying the result corresponding to the operation performed by the user on the screen.

Operation data refers to the data pertaining to the operation performed on a screen displayed on a Web browser, and includes button data of any selected button, text string data entered in a field, etc. In other words, operation data includes the screen that is next displayed, and data entered by the user in a field.

The reception processing unit 302 receives data from an electronic device such as the MFP 100 over network, and includes a screen-data reception processor 321.

The screen-data reception processor 321 receives the operation screen data from the MFP 100, enabling the display processing unit 303 to display the screen.

Figure 17:
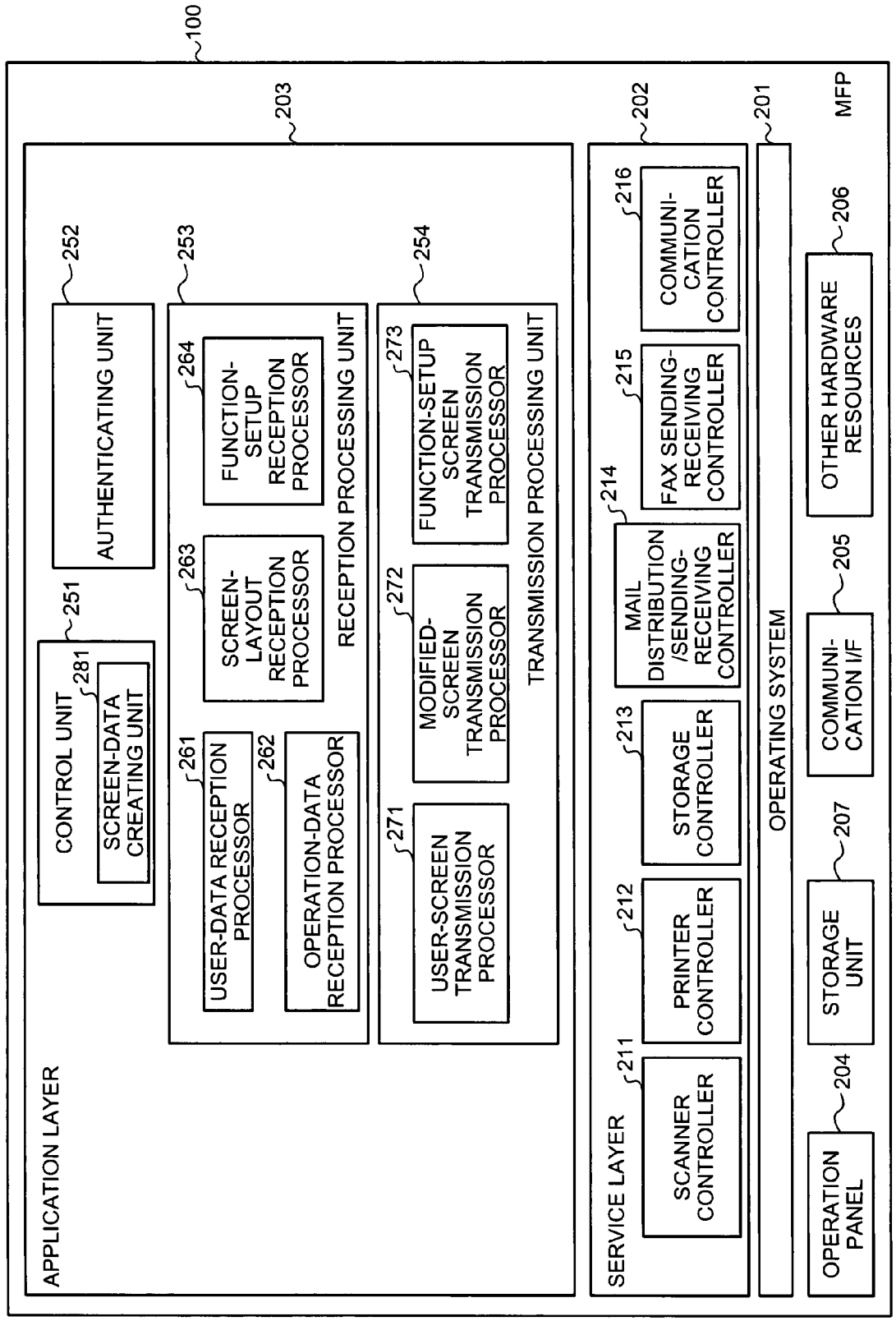
FIG. 17 is a functional block diagram of the MFP according to the embodiment.

FIG. 17 is a functional block diagram of the MFP 100 according to the embodiment. The MFP 100 includes an operating system 201, a service layer 202, an application layer 203, a communication interface (I/F) 205, other hardware resources 206.

The functions of the MFP 100 shown in FIG. 17 are stratified with the operating system 201 forming the lowermost layer, the service layer 202 forming the middle layer, and the application layer 203 that includes the salient function of the embodiment forming the uppermost layer.

The operating system 201 manages the resources, including hardware resources, of the MFP 100 and provides the service layer 202 and the application layer 203 with the functions using the resources.

The service layer 202 corresponds to drivers that control the hardware resources of the MFP 100. The service layer 202 executes various functions by controlling the hardware resources of the MFP 100, from a scanner controller 211, a printer controller 212, a storage controller 213, a mail distribution/sending-receiving controller 214, a FAX sending-receiving controller 215, a communication controller 216, etc., in accordance with request of an input process or an output process from the relevant unit of the application layer 203.

The operation panel 204 receives operations from the user when the functions of the MFP 100 are used.

Figure 18:
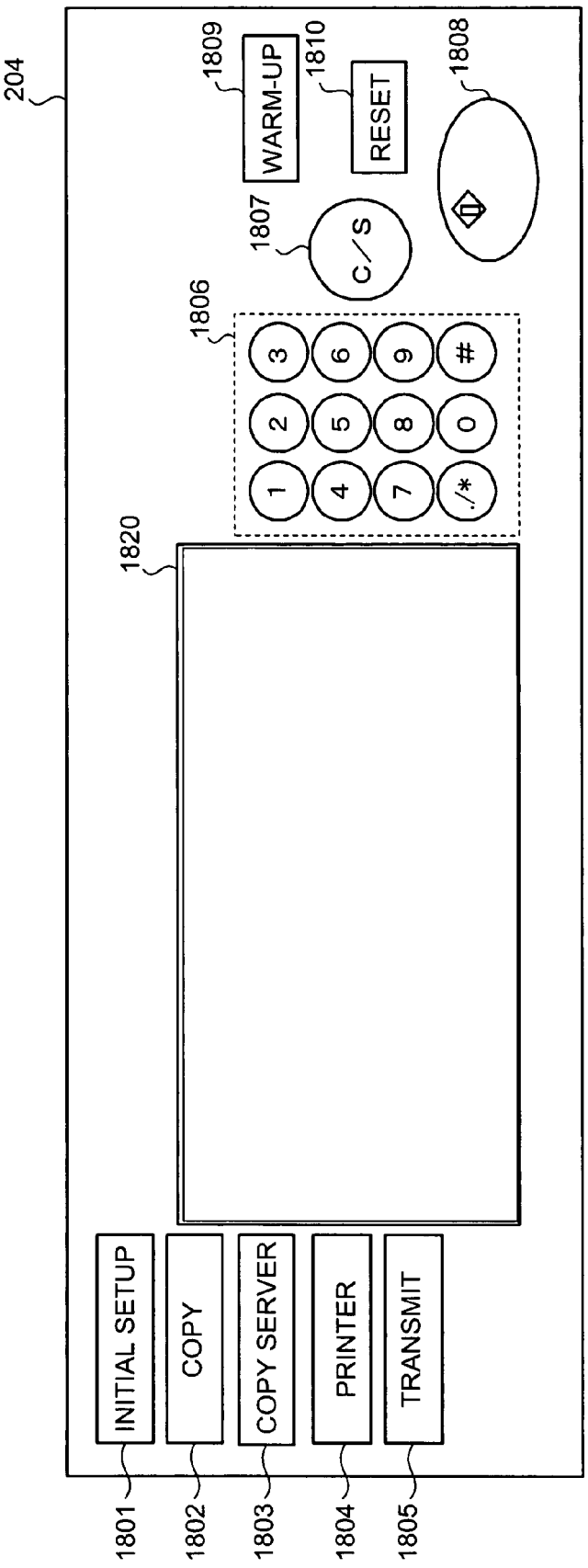
FIG. 18 is a schematic representation of an operation panel of the MFP according to the embodiment.

FIG. 18 is a schematic representation of the operation panel 204 of the MFP 100. The operation panel 204 includes an Initial Setup key 1801, a Copy key 1802, a Copy server key 1803, a Printer key 1804, a Transmit key 1805, a numeric keypad 1806, a Clear/Stop key 1807, a Start key 1808, a Warm-up key 1809, a Reset key 1810, and the liquid-crystal-display touch panel 1820.

When a user logs in by entering the user ID and password on the LCD touch panel 1820, the display area of a user's remote UI screen is displayed on the LCD touch panel 1820. For example, if we take the user's remote UI screen 404 shown in FIG. 7 as an example, the contents of the display area 701 are displayed on the LCD touch panel 1820.

In other words, the administrator can see the contents of the LCD touch panel 1820 by switching to the relevant user on the other user's remote UI screen 408 displayed on the PC 150a, etc.

When the user's remote UI screen 404 is customized on the UI-customize screen 409 displayed on the PC 150a, the customized screen is displayed on the LCD touch panel 1820. Thus, the user can easily operate the MFP 100 using a screen customized to the user's requirement.

The storage unit 207 stores therein the layout data of the user's remote UI screens customized by the users. When a user logs in, the UI screen corresponding to the user is read from the storage unit 207 and displayed. The layout data of the UI screen of the users is the screen data customized by each user on the UI-customize screen 409 on the client device such as the PC 150a. The screens that are customized by the user are the user's remote UI screen 404, the other user's remote UI screen 408, etc.

The storage unit 207 can also store therein operation screen data of the status screen 402, the setup screen 410, the setup assist screen 411, the function setup screen 412, etc., output to the client device.

The storage unit 207 also stores therein setup data input by the user required for the processes performed by the MFP 100.

The storage unit 207 can be any generally-used storage medium such as a hard disk drive (HDD), optical disk, memory card, and random access memory (RAM).

The communication (I/F) 205 helps the MFP 100 send data to and receive data from other electronic devices over the network, enabling the user to log into the MFP 100 from the PC 150a.

The hardware resources 206 collectively refer to various hardware resources of the MFP 100 such as storage device, scanner, and plotter. The hardware resources 206 are similar to those provided in the conventional MFP and therefore are not described here.

The application layer 203 performs processes such as sending login screen data to the PC 150a, receiving operation data from the login screen, or performs the process corresponding to the operation data received from the PC 150a, and includes a control unit 251, an authenticating unit 252, a reception processing unit 253, and a transmission processing unit 254.

The transmission processing unit 254 transmits operation screen data to the client device such as the PC 150a, and includes a user-screen transmission processor 271, a modified-screen transmission processor 272, and a function-setup screen transmission processor 273.

The user-screen transmission processor 271 transmits the operation screen data of individual users to the client device such as the PC 150a. Specifically, the user-screen transmission processor 271 transmits the operation screen data of the user's remote UI screen 404, the administrator's remote UI screen 406, or the other user's remote UI screen 408. The operation screen data transmitted by the user-screen transmission processor is created whenever required by the control unit 251.

When a user-data reception processor 261 described later receives a user ID, the user-screen transmission processor 271 retrieves from the control unit 251 the operation screen data to be displayed to the user corresponding to the user ID and transmits the operation screen data to the client device of the user. Thus, when a user logs in using the client device such as the PC 150a, the client device displays the user's remote UI screen 404, the administrator's remote UI screen 406, or the other user's remote UI screen 408, as the case may be. The authenticating unit 252 described later, if required, performs an authentication process prior to the transmission of the operation screen data.

The modified-screen transmission processor 272 transmits the operation screen data of the UI-customize screen 409 to the client device such as the PC 150a.

In other words, when the reception processing unit 253 described later receives a transmission request for the UI-customize screen 409, the control unit 251 retrieves from the storage unit 207 the UI screen corresponding to the user who made the request and creates the UI-customize screen 409 including in it the UI screen. The modified-screen transmission processor 272 retrieves the operation screen data of the UI-customize screen 409 from the control unit 251 and transmits the retrieved operation screen data to the client device from which the request was made.

The function-setup screen transmission processor 273 transmits the operation screen data concerning setup to the client device such as the PC 150a. Specifically, the function-setup screen transmission processor 273 transmits the setup screen 410, the setup assist screen 411, and the function setup screen 412 to the client device. When an operation-data reception processor 262 described later receives operation data for changing the current screen to a different screen (for example, data pertaining to selection of a process on the setup screen 410), the function-setup screen transmission processor 273 retrieves from the storage unit 207 the operation screen data corresponding to the new screen (for example the setup assist screen 411) and transmits the retrieved operation screen data to the client device.

The reception processing unit 253 receives data from the client device such as the PC 150a, and includes the user-data reception processor, the operation-data reception processor, a screen-layout reception processor 263, and a function-setup reception processor 264.

The user-data reception processor 261 receives the user ID from the client device such as the PC 150a, as required, receives the password associated with the user ID. From the user ID received by the user-data reception processor 261, the MFP 100 can identify the user being selected on the administrator's remote UI screen 406. When both the user ID and the password are received by the user-data reception processor 261, the authenticating unit 252 described later performs the authentication process. The operation data received by the operation-data reception processor described later determines which screen will be displayed next.

The operation-data reception processor 262 receives the operation data the user inputs on the screen displayed on the client device such as the PC 150a. The operation data received by the operation-data reception processor 262 is used by a screen-data creating unit 281 of the control unit 251 to create the operation screen data of the next screen. The transmission processing unit 254 transmits the operation screen data of the next operation screen to the client device.

The screen-layout reception processor 263 receives the screen layout data input by the user on the UI-customize screen 409 displayed on the client device. The control unit 251 associates the layout data with the user and stores it in the storage unit 207. Thus, the next time a user logs in, the user's layout data is retrieved, displaying a modified UI screen on the operation panel 204 or the client device.

The function-setup reception processor 264 receives the setup data input on the setup assist screen 411 and the function setup screen 412 displayed on the client device. The control unit 251 performs function setup of the MFP 100 based on the setup data, enabling the MFP 100 to perform the process related to the function selected by the user.

The control unit 251 makes requests to the service layer 202 to perform the processes using the hardware in the MFP 100, and includes the screen-data creating unit 281. Thus, the MFP 100 can be made to perform functions like scanning and printing.

The control unit 251 requests the processes to be performed according to the operation data received by the operation-data reception processor 262, enabling the user to avail of the MFP 100 from the user's remote UI screen 404.

Further, the control unit 251 stores the layout data received by the reception processing unit 253 in the storage unit 207 and performs function setup of the MFP 100 based on the setup data.

The control unit 251 also retrieves the operation screen data that indicates the operation screen being viewed by a user who has logged in. When sending the operation screen data to the administrator, whenever necessary, the control unit 251 modifies the format of the operation screen data so that operation screen can be displayed on the PC 150a the administrator has logged into.

When no screen data is available for output upon reception of the operation data from the user, the screen-data creating unit 281 creates the operation screen data to be output on the LCD touch panel 1820 or on the client device. The screen-data creating unit 281 creates the operation screen data to be displayed on the client device in Flash data format of Macromedia® or HTML format that allows the screen to be displayed on a Web browser. The operation screen data created by the screen-data creating unit can also be in a format that can be displayed using a plugin function on the Web browser. Further, whenever necessary, the screen-data creating unit 281 retrieves the layout data of the user stored in the storage unit 207 and creates the operation screen data. The operation screen data created by the control unit 251 is output to the user-screen transmission processor 271, etc.

The screen-data creating unit 281 adds the pulldown menu 901 when creating the administrator's remote UI screen 406. The pulldown menu 901 displays all the names of all the users currently logged in to the MFP 100, and internally maintains a list of user names associated with the user ID. Thus, any user who has currently logged into the MFP 100 can be selected from the pulldown menu 901.

The authenticating unit 252 performs the authentication process based on the user ID and password received by the user-data reception processor 261 or the user ID and password input on the LCD touch panel 1820. The authenticating unit 252, for example, performs authentication by comparing the user ID and password input by the user and password having the user ID received by the user-data reception processor 261 in a not shown user authentication table stored in the storage unit 207.

According to the embodiment, the screen displayed to the user when operating the MFP 100 is the same whether on the liquid crystal touch panel or on a Web browser on a PC that has logged in from a remote location. Thus, the user can use the MFP 100 with ease, be it a liquid crystal touch panel or a remote PC.

Figure 19:
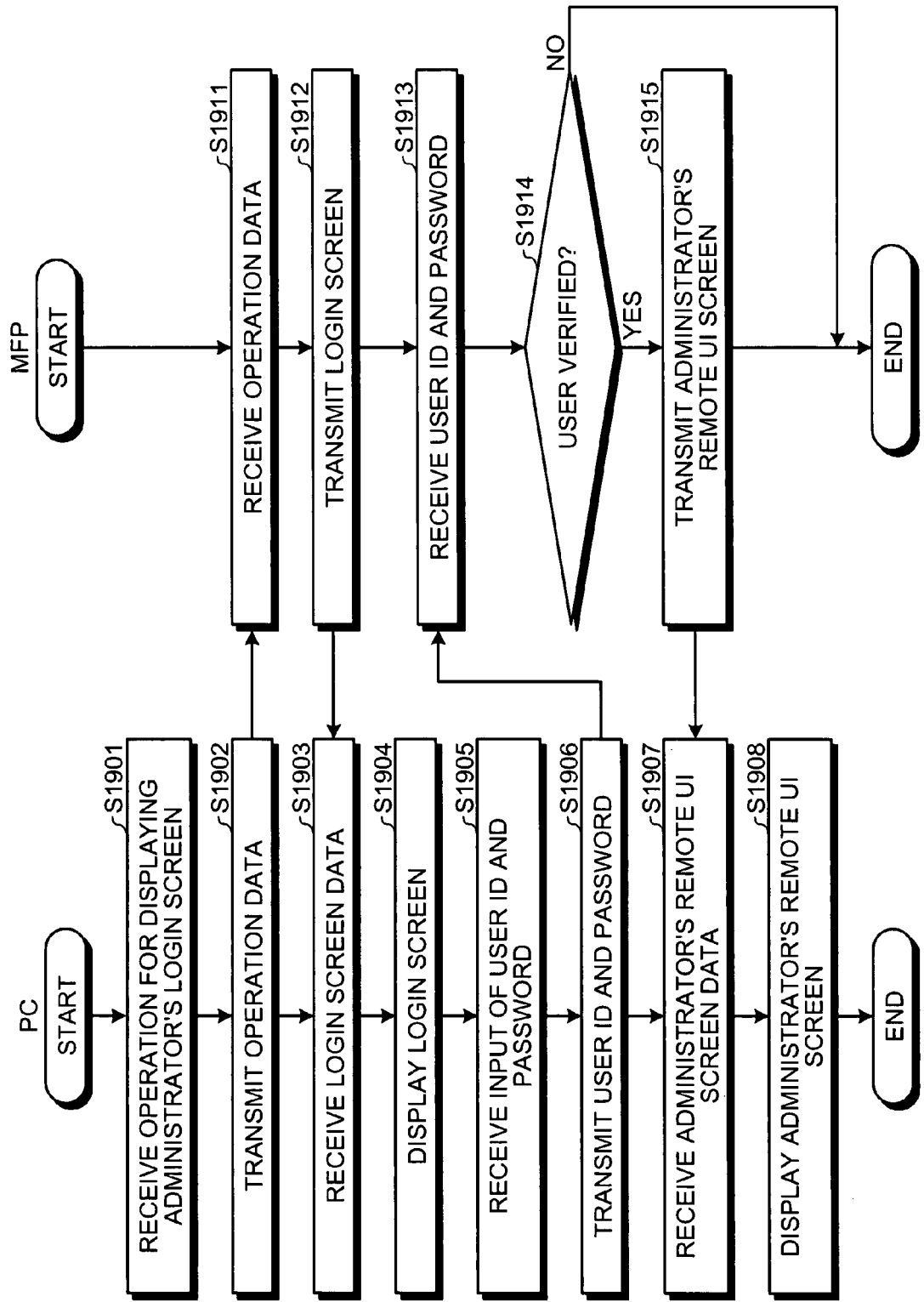
FIG. 19 shows two flowcharts, one showing a process performed by the PC and the other showing a process performed by the MFP for the transition of the screen from the administrator's login screen to the administrator's remote UI screen.

The processes performed by the MFP 100 according to the present invention and the PC 150a from the step of displaying the administrator's login screen 405 up to the step of displaying of the administrator's remote UI screen 406 are described next. FIG. 19 shows two flowcharts, one showing the process performed by the PC 150a and the other showing the process performed by the MFP 100 for the transition of the administrator's login screen 405 to the administrator's remote UI screen 406.

The operation receiving unit 304 of the PC 150*a* receives from the input device 20 the operation data for displaying the administrator's login screen 405 (step S1901).

The screen-operation transmission processor 312 transmits the operation data to the MFP (step S1902).

The operation-data reception processor 262 of the MFP 100 receives the operation data from the PC 150*a* (step S1911). The reception of the operation data by the operation-data reception processor recognizes that a request for the administrator's login screen 405 has been made. The screen-data creating unit 281 of the MFP 100 then creates the operation screen data of the administrator's login screen 405.

The transmission processing unit 254 of the MFP 100 then transmits the administrator's login screen 405 created by the screen-data creating unit 281 to the PC 150*a* (step S1912).

The screen-data reception processor 321 of the PC 150*a* receives the operation screen data of the administrator's login screen 405 (step S1903).

The display processing unit 303 of the PC 150*a* displays the administrator's login screen 405 based on the operation screen information received by the screen-data reception processor 321 (step S1904).

The operation receiving unit 304 of the PC 150*a* receives from the input device 20 the input of the user ID and password on the administrator's login screen 405 (step S1905).

The user-data transmission processor 311 of the PC 150*a* then transmits the user ID and password to the MFP 100 (step S1906).

The user-data reception processor 261 of the MFP 100 receives the user ID and password from the PC 150*a* (step S1913).

The authenticating unit 252 of the MFP 100 performs the authentication process based on the user ID and password (step S1914). If the authentication fails (No at step S1914), the process is ended.

If the authentication is successful (Yes at step S1914), the screen-data creating unit 281 of the MFP 100 creates the operation screen data of the administrator's remote UI screen 406, and the user-screen transmission processor 271 transmits the operation screen data of the administrator's remote UI screen 406 to the PC 150*a* (step S1915).

The screen-data reception processor 321 of the PC 150*a* receives the operation screen data of the administrator's remote UI screen 406 (step S1907).

The display processing unit 303 of the PC 150*a* displays the administrator's remote UI screen 406 based on the operation screen data received by the screen-data reception processor 321 (step S1908).

Thus, the user can see the administrator's remote UI screen 406 from the PC 150*a*. The processes performed by the embodiment should not be limited to those discussed herein.

Figure 20:
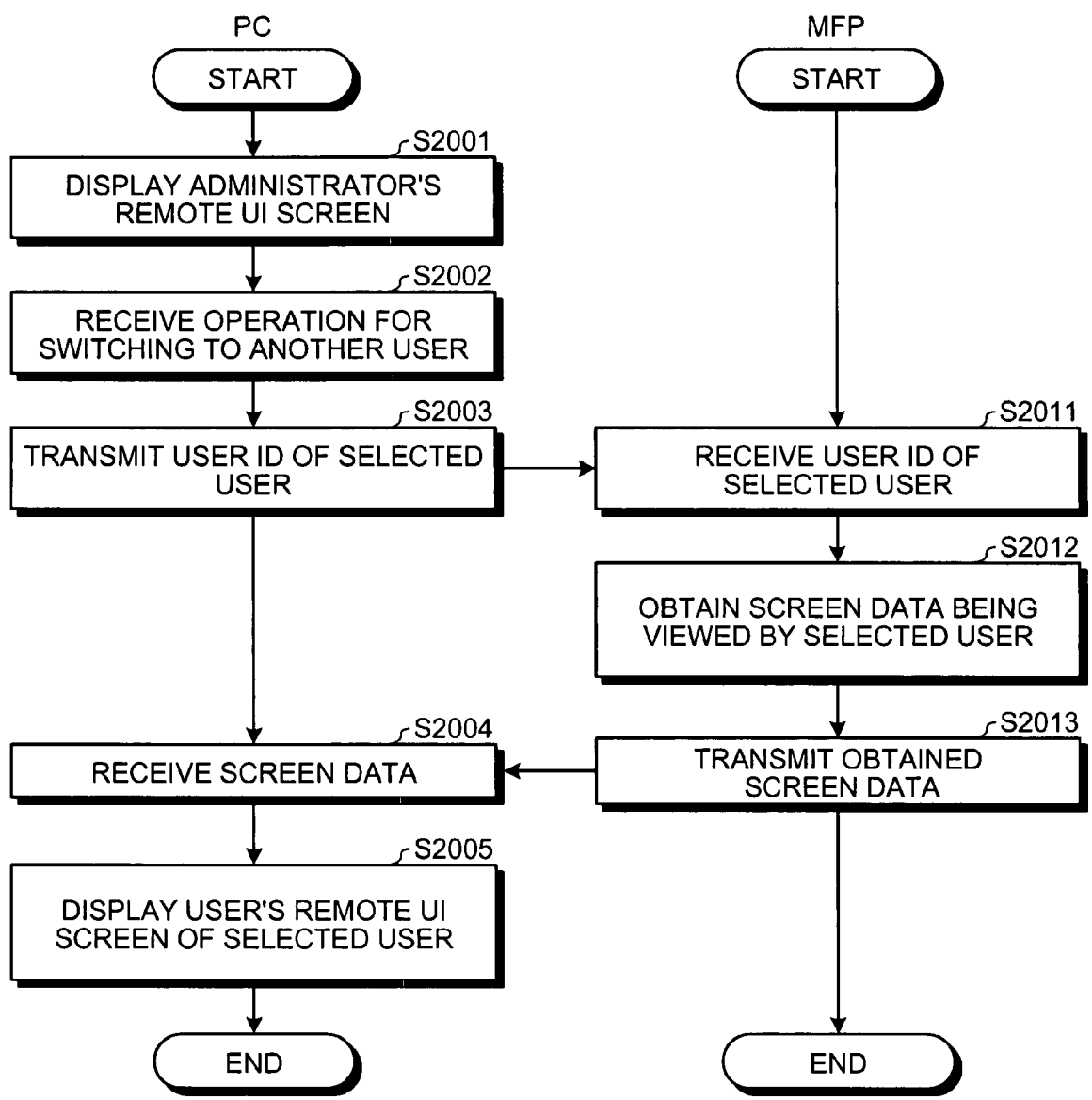
FIG. 20 shows two flowcharts, one showing a process performed by the PC and other showing a process performed by the MFP for the transition of the administrator's remote UI screen to the administrator's user remote UI screen.

The processes performed by the MFP 100 and the PC 150*a* from the step of displaying the administrator's remote UI screen 406 to the step of displaying the other user's remote UI screen 408 of a different user are described below. FIG. 20 shows two flowcharts, one showing the process performed by the PC 150*a* and the other showing the process performed by the MFP 100 for the transition of the administrator's remote UI screen 406 to the other user's remote UI screen 408 of a different user.

The display processing unit 303 of the PC 150*a* displays the administrator's remote UI screen 406 by the processes described with reference to FIG. 19 (step S2001).

The operation receiving unit 304 of the PC 150*a* then receives the selection of another user on the administrator's remote UI screen 406 (step S2002). Specifically, the operation receiving unit 304 receives the selection of a user from the pulldown menu 901 shown in FIG. 10.

The user-data transmission processor 311 of the PC 150*a* transmits the user ID of the selected user to the MFP 100 (step S2003). Concurrently, the screen-operation transmission processor 312 also transmits to the MFP 100 the operation data indicating that the screen that is sought next is the other user's remote UI screen 408.

The user-data reception processor 261 of the MFP 100 receives the user ID (step S2011). Concurrently, the operation-data reception processor 262 of the MFP 100 receives the operation data, and recognizes that the screen to be displayed next is the other user's remote UI screen 408.

The control unit 251 of the MFP 100 retrieves the operation screen data of the screen being viewed by the user having the user ID received by the user-data reception processor 261 (step S2012). After retrieving the operation screen data, the control unit 251 adds special fields and modifies the format required for making it the other user's remote UI screen 408.

The user-screen transmission processor 271 of the MFP 100 transmits the operation screen data retrieved by the control unit 251 to the PC 150*a* (step S2013).

The screen-data reception processor 321 of the PC 150*a* receives the operation screen data from the MFP 100 (step S2004). The operation screen data here is that of the other user's remote UI screen 408.

The display processing unit 303 of the PC 150*a* displays the other user's remote UI screen 408 based on the operation screen data received by the screen-data reception processor 321 (step S2005).

Thus, the administrator can see the screen being viewed by a user on the user's remote UI screen 404 or the touch panel. The processes performed by the embodiment should not be limited to those discussed herein.

Figure 21:
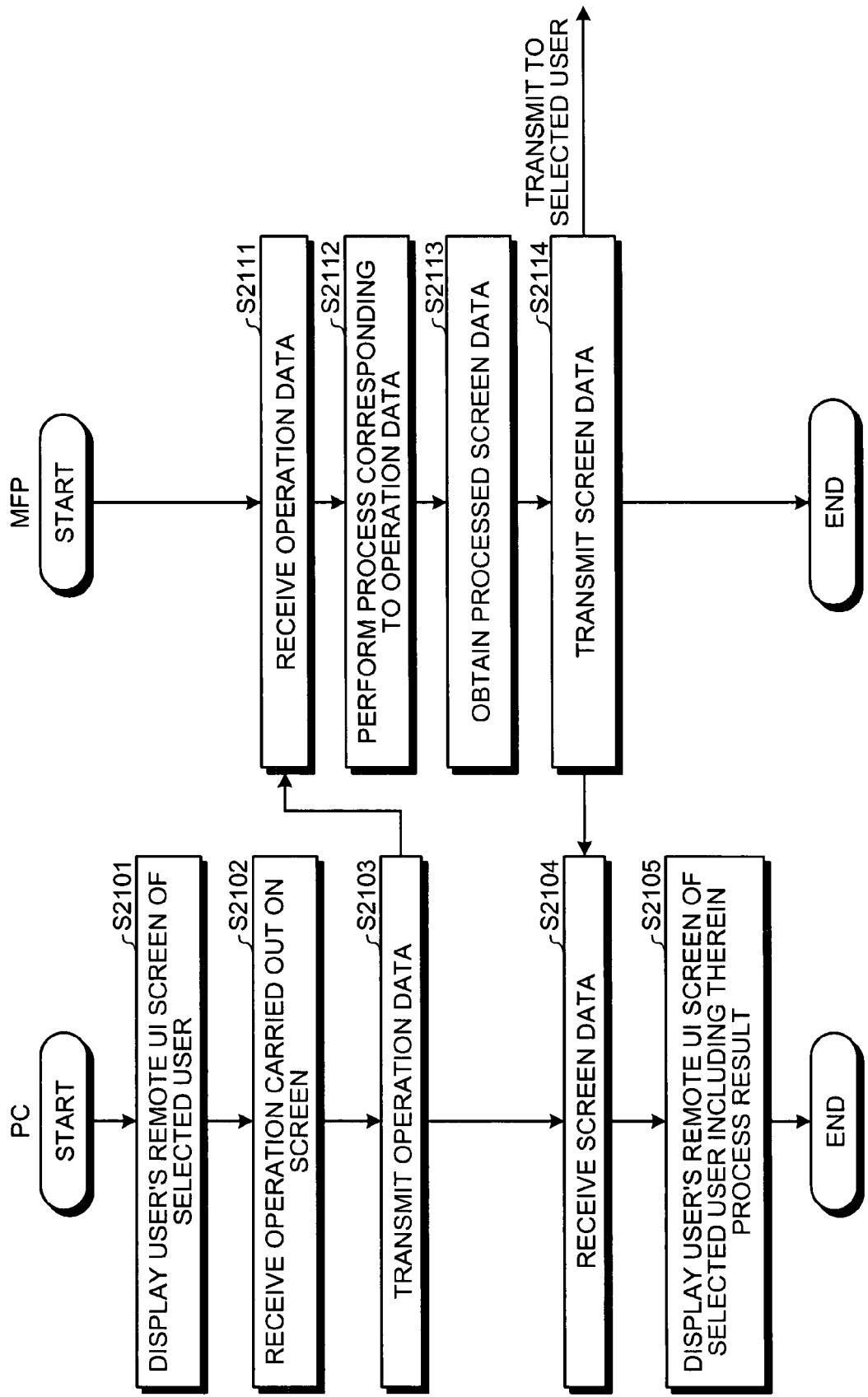
FIG. 21 shows two flowcharts, one showing a process performed by the PC and other showing a process performed by the MFP when an operation is performed on the administrator's user remote UI screen.

The processes performed by the MFP 100 and the PC 150*a* when an operation is performed on the other user's remote UI screen 408 are described below. FIG. 21 shows two flowcharts, one showing the process performed by the PC 150*a* and the other showing the process performed by the MFP 100 when an operation is performed on the other user's remote UI screen 408.

The display processing unit 303 of the PC 150*a* first displays the other user's remote UI screen 408 by the processes displayed with reference to FIG. 20 (step S2101).

The operation receiving unit 304 of the PC 150*a* receives an operation performed by the user on the other user's remote UI screen 408 using the input device 20 (step S2102). The operation can be any operation related to the functionality of the MFP 100 such as scanning of document or reading an image data stored in the storage unit 207.

The screen-operation transmission processor 312 of the PC 150*a* transmits the operation data indicating the operation to the MFP 100 (step S2103).

The operation-data reception processor 262 of the MFP 100 receives the operation data (step S2111).

The control unit 251 of the MFP 100 performs the process corresponding to the operation data received by the operation-data reception processor 262 (step S2112). The control unit 251 then retrieves the operation screen data of the screen to be displayed after the process (step S2113). The operation screen data here is assumed to be created by the screen-data creating unit 281.

The user-screen transmission processor 271 transmits the operation screen data retrieved by the control unit 251 to the PC 150*a* to which the administrator has logged in and to the client device (for example, the notebook PC 150*b*) to which the concerned user has logged in (step S2114).

The screen-data reception processor 321 of the PC 150*a* receives the operation screen data containing the operation result (step S2104).

The display processing unit 303 of the PC 150*a* then displays the user's remote UI screen 404 of the concerned user including therein the process result, based on the operation screen data received by the screen-data reception processor 321 (step S2105). The same screen is displayed on the client device of the concerned user as well. Thus, along with the user, the administrator can also check of the result of the operation performed by the user.

Thus, whenever a user is not sure as to how to operate the MFP 100, the administrator can operate the MFP 100 on behalf of the user. The processes performed by the embodiment should not be limited to those discussed herein.

Figure 22:
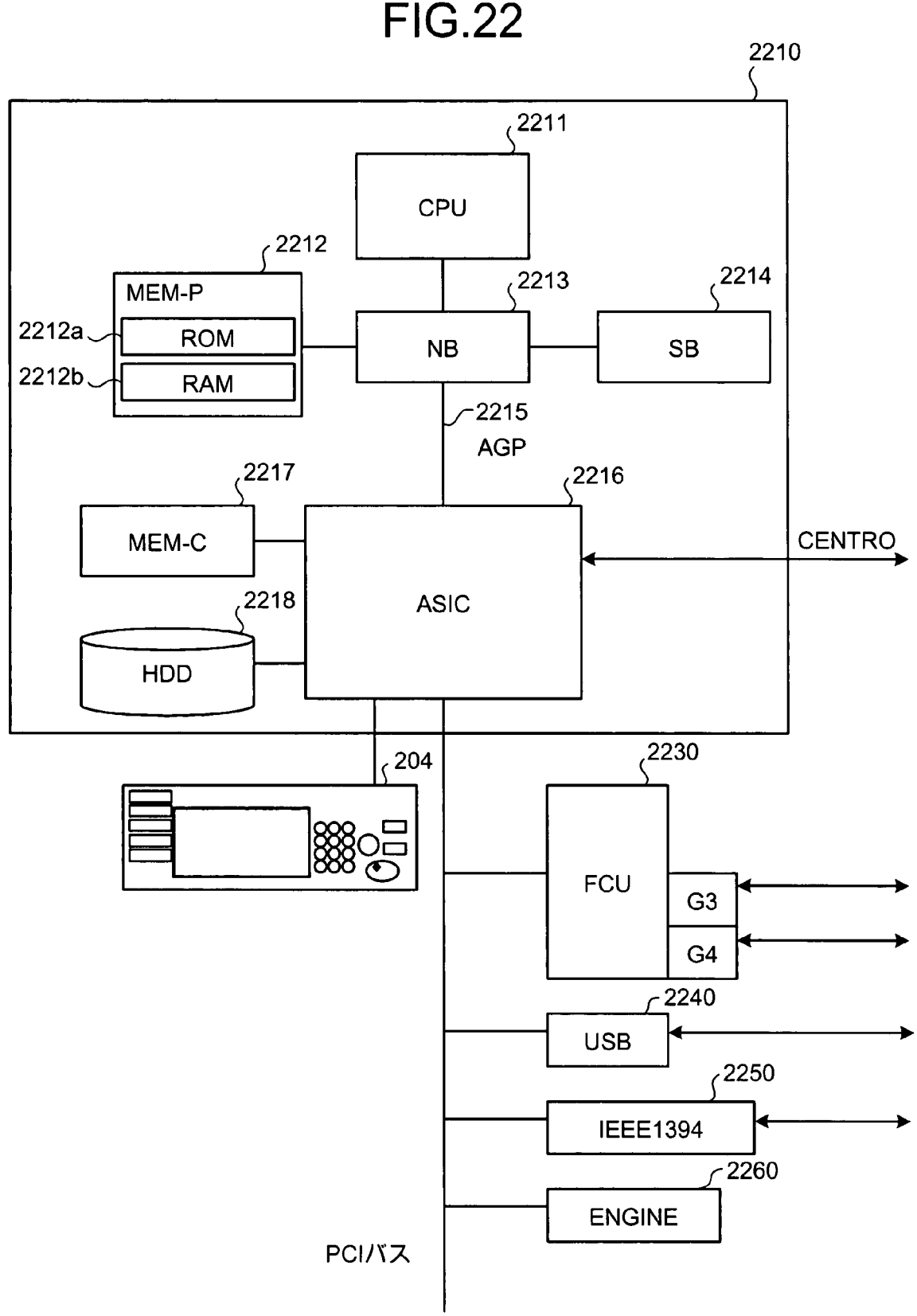
FIG. 22 is a block diagram of the MFP according to the embodiment.

FIG. 22 is a block diagram of the MFP 100. The MFP 100 includes a controller 2210 and an engine 2260 mutually connected by a peripheral component interconnect (PCI) bus. The controller 2210 controls the entire MFP 100 as well as controlling printing/plotting, communication, and input from a not shown operating unit. The engine 2260 is a printer engine, and the like, connectable to the PCI bus, and can be a BW plotter, single-drum plotter, four-drum plotter, scanner, or a FAX unit. Apart from engine parts such as the plotter, the engine 2260 also includes image processor parts such as error diffusion and comma conversion.

The controller 2210 includes a central processing unit (CPU) 2211, a Northbridge (NB) 2213, a system memory (MEM-P) 2212, a Southbridge (SB) 2214, a local memory (MEM-C) 2217, an application-specific integrated circuit (ASIC) 2216, and a hard disk drive (HDD) 2218. An accelerated graphics port (AGP) bus 2215 connects the NB 2213 and the ASIC 2216. The MEM-P 2212 further includes a read-only memory (ROM) 2212*a*, a random access memory (RAM) 2212*b*.

The CPU 2211 controls the entire MFP 100 and is connected to other devices via a chipset that includes the NB 2213, the MEM-P 2212, and the SB 2214.

The NB 2213 connects the CPU 2211 with the MEM-P 2212, the SB 2214, and the AGP bus 2215, and includes a memory controller, a PCI master, and an AGP target. The memory controller controls reading data from and writing data to the MEM-P 2212.

The MEM-P 2212 is a system memory used as storage memory in the form of storage memory, program and data deployment memory, printing memory, etc., and includes the ROM 2212*a* and the RAM 2212*b*. The ROM 2212*a* is a read-only memory used as storage memory for storing computer programs and data. The RAM 2212*b* is both a read-memory and a write-memory used as deployment memory for deployment of computer programs and printing memory used by the printer for printing.

The SB 2214 connects the NB 2213 with the PCI device and other peripheral devices. The SB 2214 connects to the NB via the PCI bus. A network interface (I/F) unit is also connected to the PCI bus.

The ASIC 2216 is an integrated circuit (IC) used in image processing, includes hardware elements required for image processing, and functions as a bridge connecting with the AGP bus 2215, the PCI bus, the HDD 2218, and the MEM-C 2217. The ASIC 2216 includes an arbiter (ARB) that forms the core of the PCI target and AGP and the ASIC 2216, a memory controller that controls the MEM-C 2217, a plurality of direct memory access controllers (DMAC) that rotate image data by hardware logic, etc., and a PCI unit that transmits data between the MFP 100 and the engine 2260 via the PCI bus. A fax control unit (FCU) 2230, a universal serial bus (USB) 2240, and an (Institute of Electrical and Electronics Engineers) IEEE 1394 interface 2250 are connected to the ASIC 2216 via the PCI bus.

The MEM-C 2217 is a local memory used as photocopy image buffer, encryption buffer, etc. The MEM-C 2217 serves as a storage unit for image data, computer programs, font data, forms, etc.

The AGP bus 2215 is a bus interface used by graphics accelerator card provided for speeding up processing of graphics. The AGP bus 2215 speeds up the graphic accelerator card by directly accessing the MEM-P 2212 at a high throughput.

Figure 23:
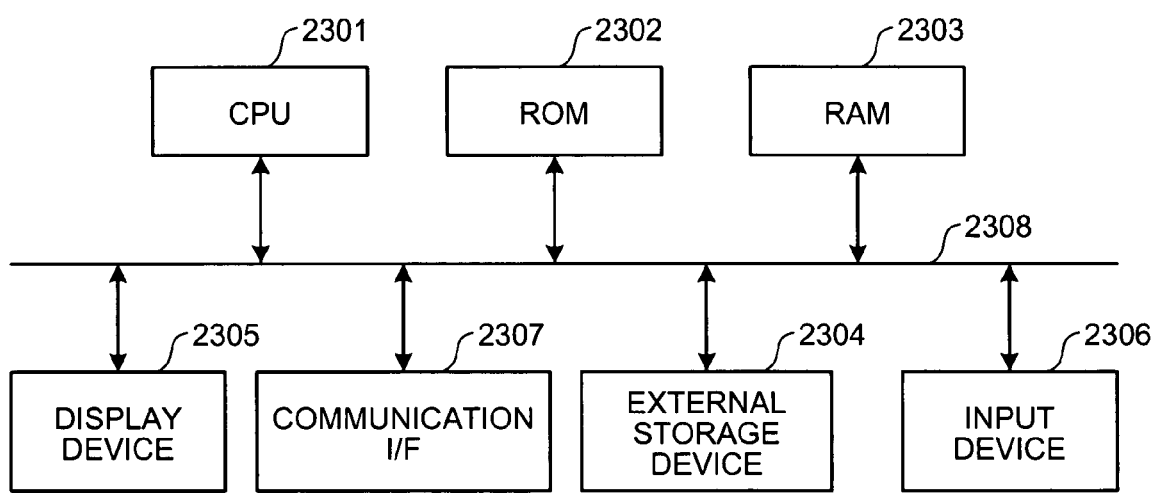
FIG. 23 is a drawing of a hardware configuration of the PC according to the embodiment.

FIG. 23 is a drawing of a hardware configuration of the PC 150*a*. The PC 150*a* has a configuration of a normal computer, including a control device such as a CPU 2301, storage devices such as a ROM 2302 and a RAM 2303, an external storage device 2304 such as a compact disk (CD) drive, a display device 2305, an input device 2306 such as a keyboard and a mouse, a communication (I/F) 2307, and a bus 2308 that connects all the above parts.

An image processing program executed by the MFP 100 according to the embodiment is installed in the ROM 2302. The image processing program can also be installed on a computer-readable recording medium such as a compact disk-read-only memory (CD-ROM), a flexible disk (FD), a compact disk-recordable (CD-R), and a digital versatile disk (DVD).

Alternatively, the image processing program can be stored on a computer connected to a network such as the Internet, and downloaded over the network. The image processing program can be configured such that it can be offered or distributed over the Internet.

The image processing program executed by the MFP 100 according to the embodiment includes a module for the process of each of the parts described earlier (the control unit, the authenticating unit, the reception processing unit, and the transmission processing unit). The CPU reading the image processing program from the ROM is tantamount to each of the parts being loaded on the main storage device.

In the MFP 100 according to the embodiment, the administrator can view the operation screen being viewed by the user on the client device such as the PC 150*a*, and the notebook PC 150*b* and thus can intervene on behalf of the user if the user faces some problem concerning the operation of the MFP 100.

Furthermore, instead of the user the administrator can operate the MFP 100 by using the other user's remote UI screen 408 and solve any problem the user might be facing concerning the operation of the MFP 100, making it more user-friendly.

According to the embodiment, the image data is created in a format that can be viewed on a Web browser. This obviates the need for installing a dedicated computer program on the client device. Further, as the operation screen can be looked up from any client device, enhancing the convenience factor.

Thus, apart from the common computers such as the personal computers, the screen displayed on the liquid crystal touch panel of the MFP according to the embodiment can also be displayed on other devices.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication control device connected via a network to each of a first display processing device and a second display processing device, and configured to be logged into by a plurality of users at the second display processing device, and to send through the network to the second display processing device, operation screen data associated with each of the plurality of users who are logged into the communication control device, the communication control device comprising:
   a first receiving unit that receives, from the first display processing device, user-specific identification data of one or more of the plurality of users of the second display processing device who are logged into the communication control device; and
   a transmitting unit that transmits to the first display processing device, the operation screen data associated with the user identified by the user-specific identification data of said one or more of the plurality of users.

2. The communication control device according to claim 1, further comprising
   a second receiving unit that receives operation data from the first display processing device, the operation data indicating an operation performed on the operation screen displayed on the first display processing device based on the first operation screen data, wherein
   the transmitting unit transmits second operation screen data including a result of the operation performed based on the operation data received by the second receiving unit to the first display processing device.

3. The communication control device according to claim 2, further comprising a control unit that performs, when the operation data is received by the second receiving unit, a process corresponding to an operation specified by the operation data.

4. The communication control device according to claim 2, wherein the transmitting unit transmits the second operation screen data to the second display processing device in addition to the first display processing device.

5. The communication control device according to claim 1, further comprising
   an authenticating unit that performs an authenticating process of determining whether the first display processing device is authorized to refer to the first operation screen data, wherein
   when it is determined that the first display processing device is authorized to refer to the first operation screen data, the transmitting unit transmits the first operation screen data to the first display processing device.

6. The communication control device according to claim 1, wherein the first operation screen data is operation screen data being output to a display device of the communication control device used by a user.

7. The communication control device according to claim 1, wherein the first operation screen data is operation screen data being output to the second display processing device of the user logged into the communication control device via the network.

8. The communication control device according to claim 1, wherein the transmitting unit transmits the first operation screen data to the first display processing device in a format that can be viewed on a Web browser.

9. The communication control device according to claim 1, wherein the transmitting unit transmits to the first display processing device third operation screen data for displaying a third operation screen, and the third operation screen includes a user selection list of all users logged into the communication control device, and a different user is selected from among the users of the user selection list to generate the user-specific identification data of the different user.

10. The communication control device according to claim 1, wherein the first operation screen is customized by the user specified by the user-specific identification data, and the communication control device further comprises a storage unit that stores the first operation screen data for displaying the first customized operation screen in association with the user.

11. The communication control device according to claim 10, wherein the first operation screen data stored by the storage unit is layout data of the first customized operation screen.

12. The communication control device according to claim 10, wherein the customization includes at least one of addition, deletion, rearrangement, downsizing and enlarging.

13. The communication control device according to claim 10, wherein the customization of the first operation screen by the user includes changing size of a graphical object on the first operation screen.

14. A communication control method for a communication control device to control communication between a first display processing device and a second display processing device, each of the first display processing device and the second display processing device being connected to the communication control device via a network, the communication control device being configured to be logged into by a plurality of users at the second display processing device, and to send through the network to the second display processing device, operation screen data associated with each of the plurality of users who are logged into the communication control device, the communication control method comprising:
   (a) receiving, by the communication control device from the first display processing device, user-specific identification data of one or more of the plurality of users of the second display processing device who are logged into the communication control device; and
   (b) transmitting, by the communication control device to the first display processing device, the operation screen data associated with the user identified by the user-specific identification data of said one or more of the plurality of users.

15. The communication control method according to claim 14, further comprising:
   receiving, by the communication control device, operation data from the first display processing device, the operation data indicating an operation performed on the operation screen displayed on the first display processing device based on the first operation screen data; and
   transmitting, by the communication control device, second operation screen data including a result of the operation performed based on the operation data received at the second receiving to the first display processing device.

16. The communication control method according to claim 15, further comprising controlling including performing by the communication control device, when the operation data is received at the second receiving, a process corresponding to an operation specified by the operation data.

17. The communication control method according to claim 14, further comprising authenticating including performing by the communication control device an authenticating process of determining whether the first display processing device is authorized to refer to the first operation screen data, wherein when it is determined that the first display processing device is authorized to refer to the first operation screen data, the transmitting includes transmitting the first operation screen data to the first display processing device.

18. The communication control method according to claim 14, wherein the first operation screen data is operation screen data being output to a display device of the communication control device used by a user.

19. The communication control method according to claim 14, wherein the first operation screen data is operation screen data being output to the second display processing device of the user logged into the communication control device via the network.

20. A communication control system that includes a first display processing device, a second display processing device and a communication control device connected via a network to each of the first display processing device and the second display processing device, wherein
the communication control device is configured to be logged into by a plurality of users at the second display processing device, and to send through the network to the second display processing device, operation screen data associated with each of the plurality of users who are logged into the communication control device, and
the communication control device includes
a first receiving unit that receives, from the first display processing device, user-specific identification data of one or more of the plurality of users of the second display processing device who are logged into the communication control device, and
a first transmitting unit that transmits, to the first display processing device, the operation screen data associated with the user identified by the user-specific identification data of said one or more of the plurality of users, and
the first display processing device includes
a second transmitting unit that transmits the user-specific identification data of the user to the communication control device,
a second receiving unit that receives the first operation screen data from the first transmitting unit, and
a display processing unit that displays the operation screen based on the first operation screen data received by the second receiving unit.

* * * * *